US010778561B2

(12) United States Patent
Ranjal et al.

(10) Patent No.: US 10,778,561 B2
(45) Date of Patent: Sep. 15, 2020

(54) DIAGNOSTIC PORT FOR INTER-SWITCH AND NODE LINK TESTING IN ELECTRICAL, OPTICAL AND REMOTE LOOPBACK MODES

(71) Applicant: AVAGO TECHNOLOGIES INTERNATIONAL SALES PTE. LIMITED, Singapore (SG)

(72) Inventors: Raghavendra Shenoy Ranjal, Bangalore (IN); Kiran Sangappa Shirol, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 12 days.

(21) Appl. No.: 16/123,902

(22) Filed: Sep. 6, 2018

(65) Prior Publication Data

US 2019/0081881 A1    Mar. 14, 2019

(30) Foreign Application Priority Data

Sep. 8, 2017    (IN) .............................. 201741031816

(51) Int. Cl.
*H04L 12/26* (2006.01)
*H04L 12/24* (2006.01)
(Continued)

(52) U.S. Cl.
CPC ................ *H04L 43/50* (2013.01); *G06F 3/06* (2013.01); *G06F 11/00* (2013.01);
(Continued)

(58) Field of Classification Search
CPC ........ G06F 11/00; G06F 3/06; H04L 41/0803; H04L 43/50; H04L 49/25; H04L 67/1097;
(Continued)

(56) References Cited

U.S. PATENT DOCUMENTS 5,557,437 A * 9/1996 Sakai ................... H04B 10/075
398/136
7,397,788 B2    7/2008 Mies et al.
(Continued)

OTHER PUBLICATIONS

Brocade Communication Systems, Inc.; "Fabric OS Administrator's Guide", Supporting Fabric OS v5.3.0; Publication No. 53-1000448-01; Jun. 15, 2007.
(Continued)

*Primary Examiner* — Un C Cho
*Assistant Examiner* — Shah M Rahman
(74) *Attorney, Agent, or Firm* — Xsensus LLP

(57) ABSTRACT

A diagnostic testing utility is used to perform single link diagnostics tests including an electrical loopback test, an optical loopback test, and a link traffic test. To perform the diagnostic tests, two ports at each end of a link are identified and configured as D_Ports and as such will be isolated from the fabric with no data traffic flowing through them. Advertisement frames may be sent at predetermined time intervals to transition the two ports to different states within the diagnostic test. After transitioning to the different states, the ports will then be used to send test frames to perform the diagnostic tests.

20 Claims, 28 Drawing Sheets

(51) Int. Cl.
*H04L 12/947* (2013.01)
*H04L 29/08* (2006.01)
*G06F 11/00* (2006.01)
*G06F 3/06* (2006.01)

(52) U.S. Cl.
CPC .......... *H04L 41/0803* (2013.01); *H04L 49/25* (2013.01); *H04L 69/324* (2013.01); *H04L 67/1097* (2013.01)

(58) Field of Classification Search
CPC ....... H04L 69/324; H04L 1/243; H04L 43/12; H04L 43/14; H04B 10/035
See application file for complete search history.

(56) References Cited

U.S. PATENT DOCUMENTS

| | | | |
|---|---|---|---|
| 8,526,313 B1* | 9/2013 | Jones | H04L 43/10 370/249 |
| 8,798,456 B2 | 8/2014 | Skirmont et al. | |
| 9,312,953 B2* | 4/2016 | Soto | H04J 14/0257 |
| 9,401,760 B2 | 7/2016 | Skirmont et al. | |
| 9,967,025 B2 | 5/2018 | Garg et al. | |
| 9,998,215 B2 | 6/2018 | Skirmont et al. | |
| 10,243,823 B1* | 3/2019 | Bharadwaj | H04L 67/1097 |
| 2002/0009134 A1* | 1/2002 | Fischel | H04L 1/244 375/224 |
| 2002/1004039 | 8/2002 | Derolf et al. | |
| 2003/0115368 A1* | 6/2003 | Wu | H04L 43/50 709/251 |
| 2003/0120984 A1 | 6/2003 | Chuah et al. | |
| 2004/0071389 A1 | 4/2004 | Hofmeister et al. | |
| 2004/0228627 A1* | 11/2004 | Alana | H04Q 11/0062 398/9 |
| 2006/0018265 A1* | 1/2006 | Frodsham | H04L 43/50 370/249 |
| 2006/0093372 A1 | 5/2006 | Hahin et al. | |
| 2007/0180331 A1* | 8/2007 | Chuah | H04L 41/0677 714/43 |
| 2008/0065760 A1* | 3/2008 | Damm | H04L 43/022 709/224 |
| 2008/0232794 A1 | 9/2008 | Absillis et al. | |
| 2009/0202239 A1 | 8/2009 | Holness et al. | |
| 2009/0214221 A1 | 8/2009 | Li et al. | |
| 2010/0074614 A1 | 3/2010 | Delew et al. | |
| 2012/0051738 A1 | 3/2012 | Skirmont et al. | |
| 2012/0230209 A1* | 9/2012 | Diab | H04L 12/10 370/252 |
| 2012/0250518 A1* | 10/2012 | Diab | H04L 43/50 370/241 |
| 2013/0266307 A1* | 10/2013 | Garg | H04B 10/0773 398/16 |
| 2016/0149639 A1* | 5/2016 | Pham | H04B 10/0775 398/16 |
| 2016/0205008 A1* | 7/2016 | Dasu | H04L 43/10 709/224 |

OTHER PUBLICATIONS

Brocade Communication Systems, Inc.; "Fabric OS Command Reference Manual", Supporting Fabric OS v6.0.0; Publication No. 53-1000599-01; Oct. 19, 2007.

Brocade Communications Systems, Incorporated; "Fabric OS" Command Reference Manual, Supporting Fabric OS 6.1.0, #53-1000599-02, Mar. 12, 2008.

EP Search report from related EP Application No. EP14157829 dated Jul. 1, 2014, 5 pages.

* cited by examiner

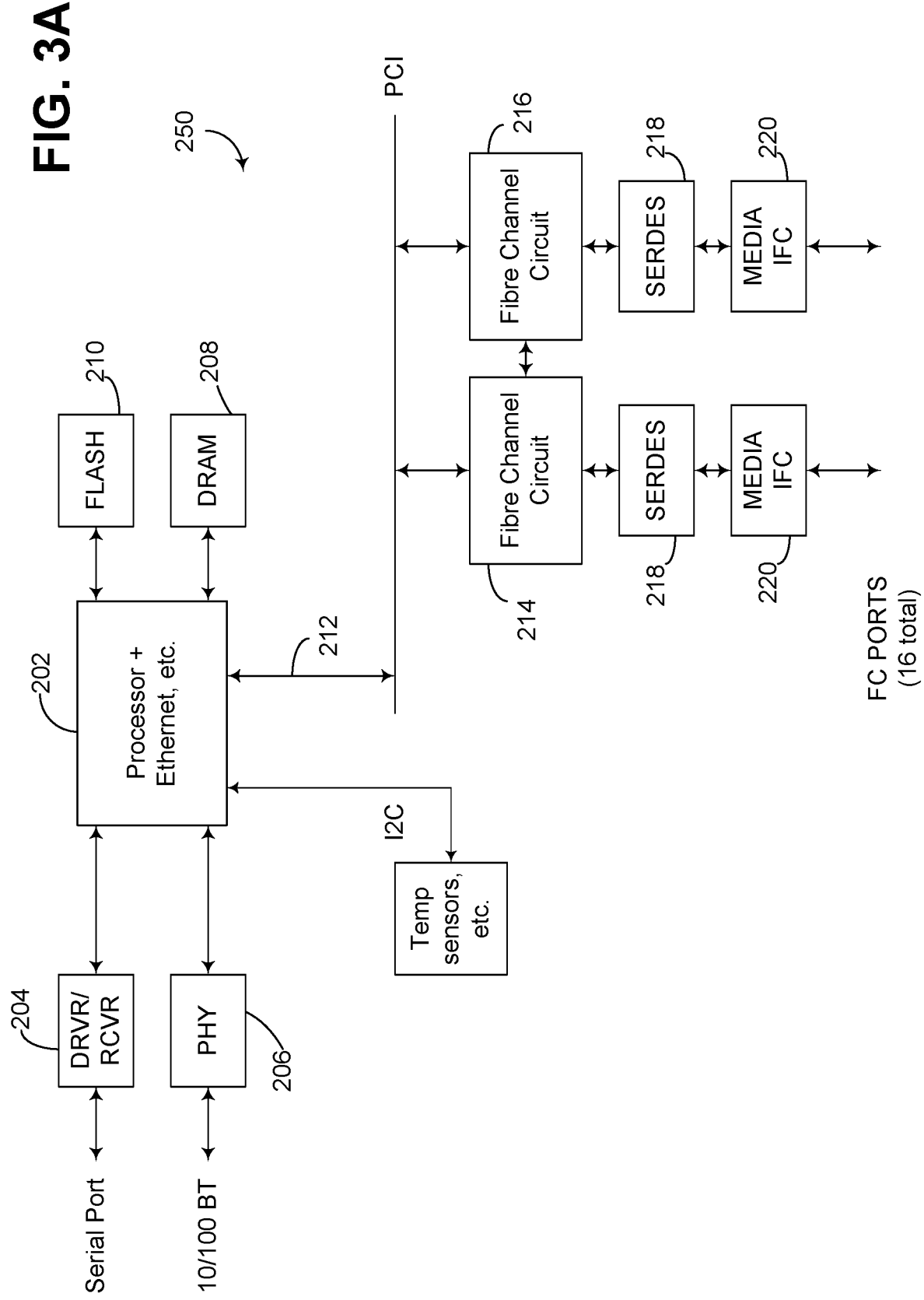

DIAGNOSTIC PORT FOR INTER-SWITCH AND NODE LINK TESTING IN ELECTRICAL, OPTICAL AND REMOTE LOOPBACK MODES

CROSS REFERENCE TO RELATED APPLICATIONS

This application claims priority of Indian Provisional Application No. 201741031816 filed Sep. 8, 2017, the contents of which is incorporated herein in its entirety by reference.

This application is related to U.S. Pat. No. 9,967,025, entitled "Diagnostic Port for Inter-Switch and Node Link Testing in Electrical, Optical and Remote Loopback Modes," which is a continuation-in-part of U.S. application Ser. No. 13/047,513, entitled "Diagnostic Port for Inter-Switch Link Testing in Electrical, Optical and Remote Loopback Modes," now U.S. Pat. No. 8,798,456, which is a non-provisional of U.S. Application Ser. No. 61/379,150 and to U.S. Pat. No. 9,998,215, entitled "Diagnostic Port for Inter-Switch Link Testing in Electrical, Optical and Remote Loopback Modes," which is a continuation of U.S. application Ser. No. 14/315,800, entitled "Diagnostic Port for Inter-Switch Link Testing in Electrical, Optical and Remote Loopback Modes," now U.S. Pat. No. 9,401,760, which is a continuation of U.S. application Ser. No. 13/047,513 all of which are incorporated herein in their entirety by reference.

TECHNICAL FIELD

The present invention relates to the field of computer networking, and in particular to techniques for performing link level diagnostics in a switch fabric.

BACKGROUND

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices are connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Many SANs rely on the FC protocol. The FC protocol defines standard media and signaling conventions for transporting data in a serial fashion. It also provides an error correcting channel code and a frame structure for transporting the data. Many FC switches provide at least some degree of automatic configurability. For example, they may automatically sense when a new inter-switch link (ISL) becomes active, and may initiate an initialization process to discover what the link connects to. The switch may automatically determine various parameters for the link (e.g. link speed). As FC networks are created, updated, maintained and decommissioned, switches may be enabled, disabled or reconfigured, and links may be added or removed.

Over time, FC networks have become more complex, with multiple fabrics involving several switches that use inter-switch links (ISLs) connected to switch ports (E_ports) on the switches. As FC networks have become more complex, the network speeds have also increased significantly. As faster networks are implemented, media and cable tolerance become more important for avoiding degraded performance and cyclic redundancy check (CRC) errors. At the same time, as larger networks are developed, diagnostic of optics and cables become more and more time consuming and intrusive. Current switches have two basic types of built-in diagnostics. First, the Small Form-factor Pluggable (SFP) electro-optical modules have digital diagnostics, but these only operate at the SFP component level. Second, a command line interface (CLI) tool may be provided to allow frames to be injected and circulated on a specific link, but the end result is only a good and bad indication, which does not greatly aid diagnosis. Thus, troubleshooting suspected link errors with the existing built-in tools is time consuming and can become a daunting task. The use of external separate testing tools is also cumbersome and brings along separate problems not present with built-in tools It would be desirable to implement an efficient network diagnostic method to more efficiently troubleshoot larger networks, thereby improving the speed, efficiency, and reliability of these networks.

SUMMARY

In one embodiment, a network link level diagnostic tool is disclosed. The diagnostic tool can monitor and set alerts for digital diagnostics, test both ends of the connectivity to validate that the links are within budget, saturate a link with a representative SAN traffic profile to validate fabric performance, monitor and trend for the integrity of the optics during its operational life cycle, and granularly measures cable distance to determine physical limitation or performance degradation of the link over time.

BRIEF DESCRIPTIONS OF THE DRAWINGS

FIG. 3A is a block diagram of an exemplary switch.

Figure 20A:
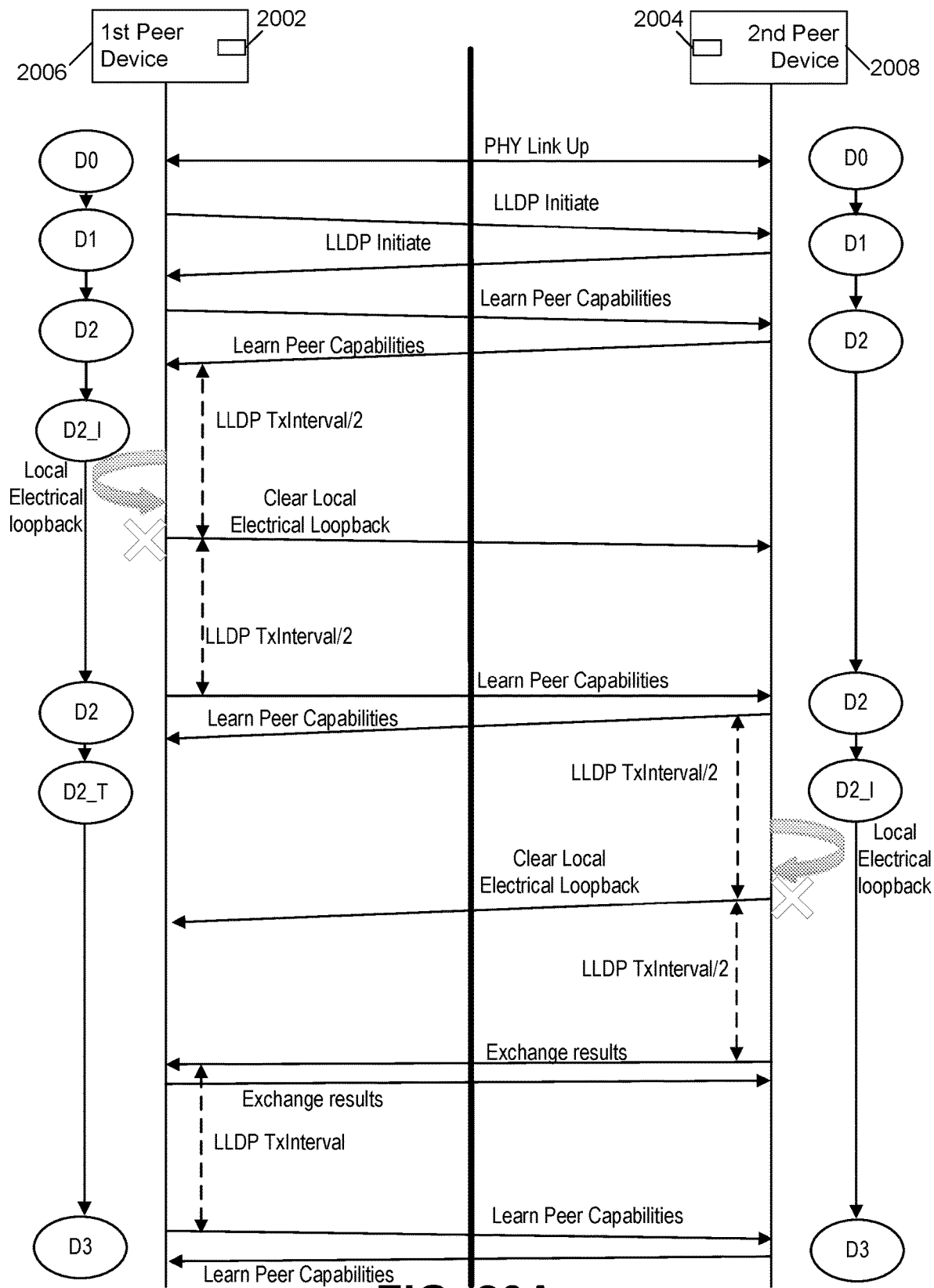
Figure 20B:
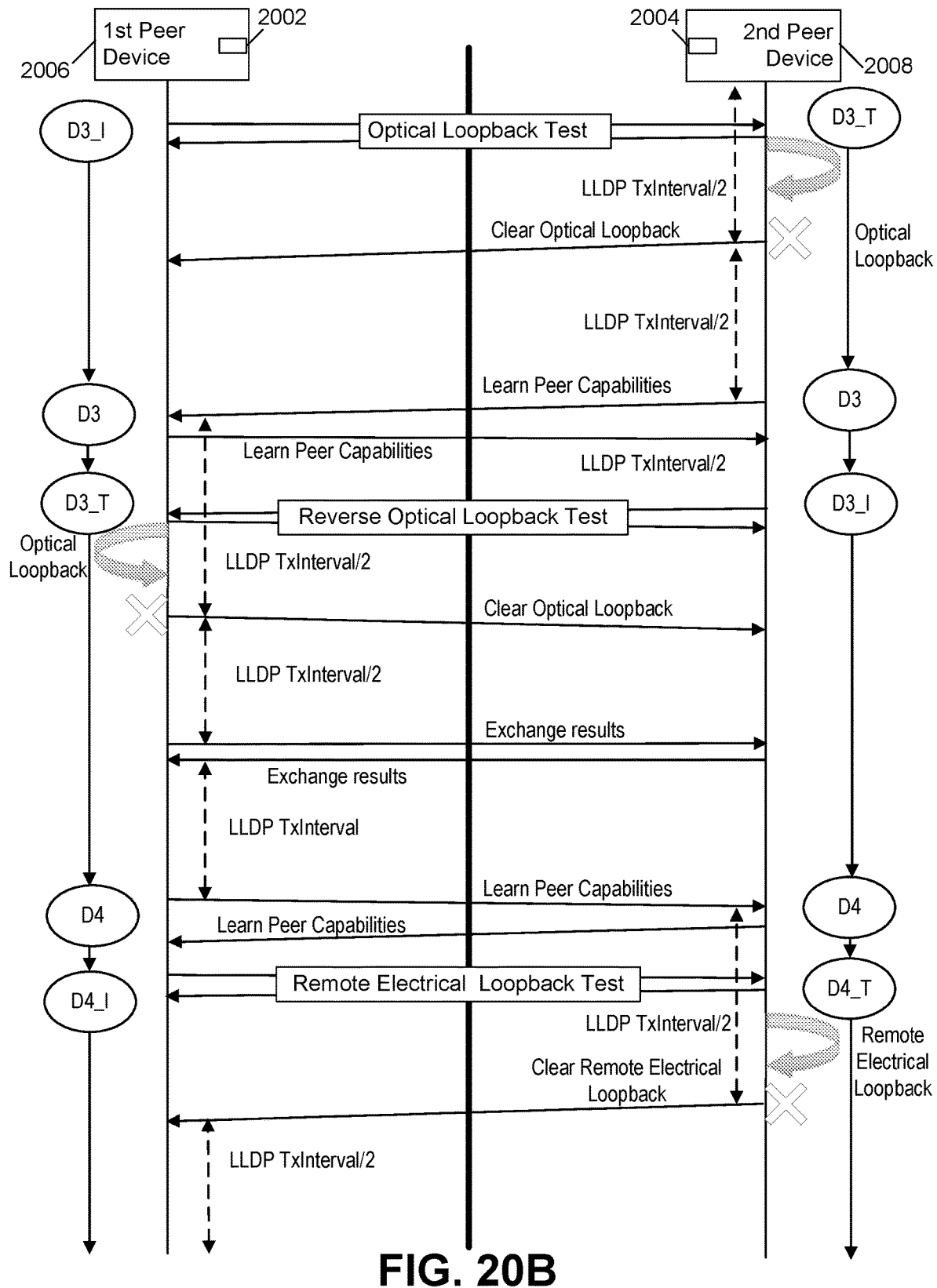
Figure 20C:
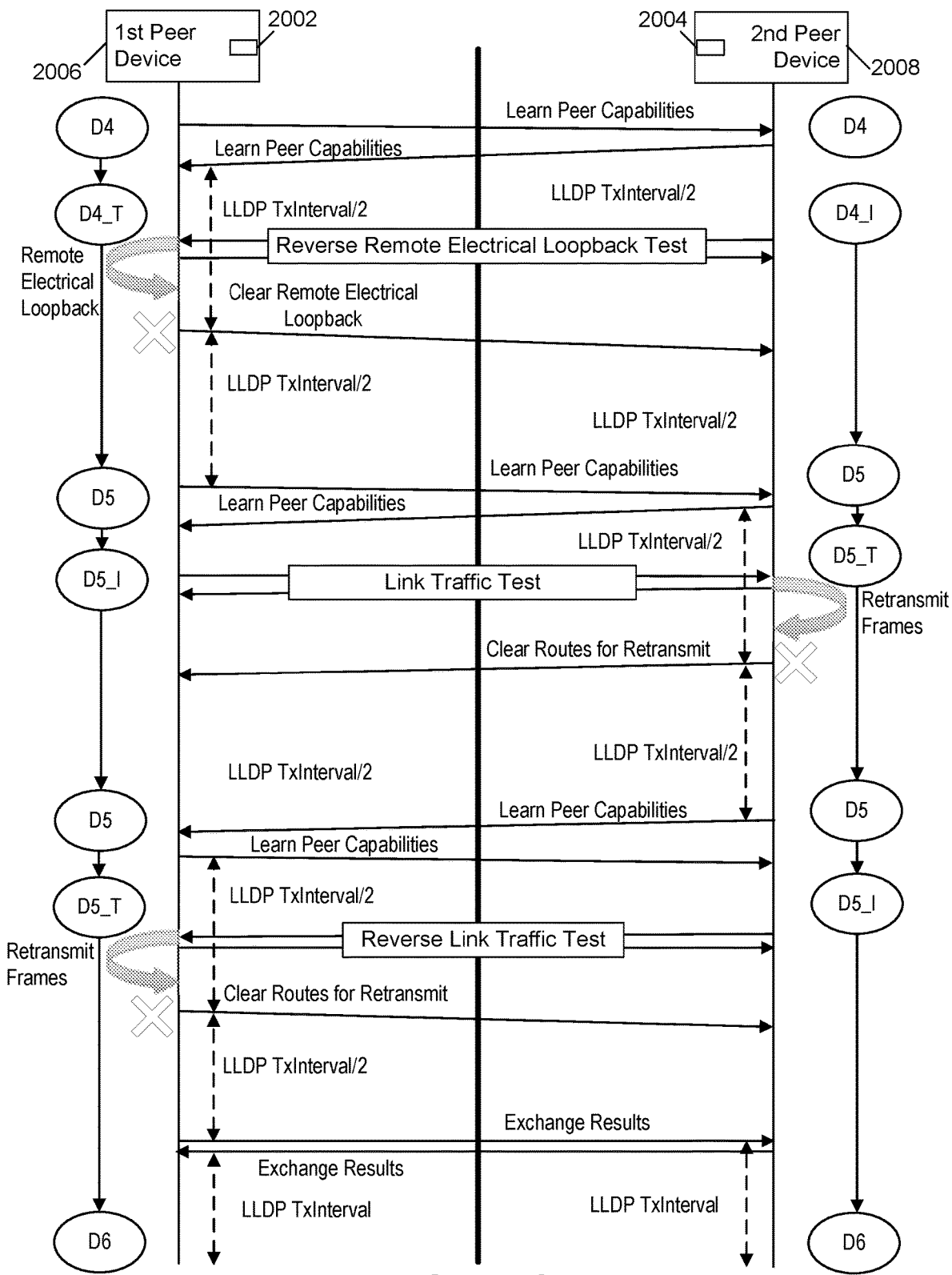

FIGS. 20A, 20B, and 20C are a ladder diagram illustrating the states of D_Ports as they progress through a D_Port diagnostic according to one embodiment for a node link.

DETAILED DESCRIPTIONS

Figure 1:
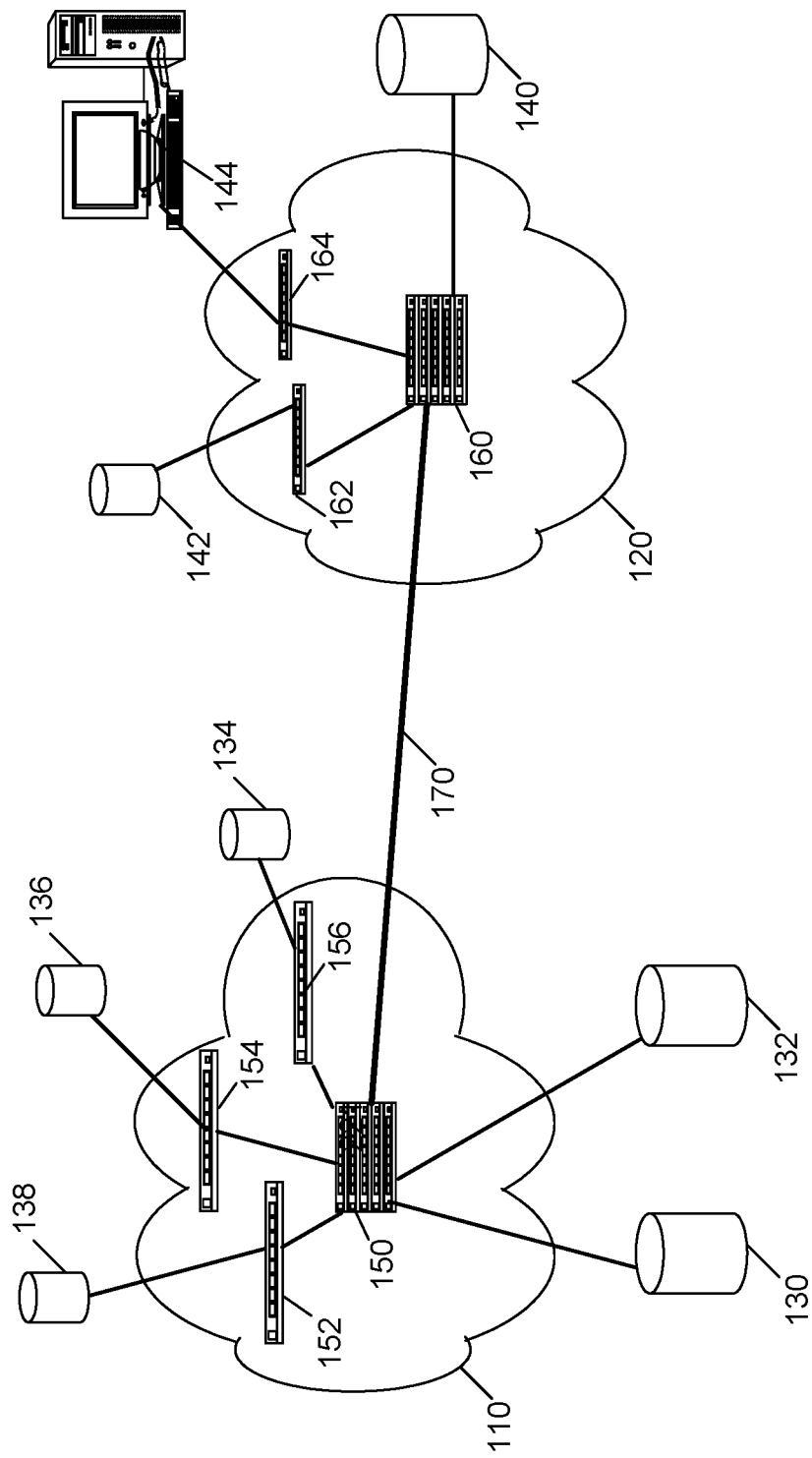
FIG. 1 is a block diagram illustrating an exemplary Fibre Channel network.

An exemplary FC network is illustrated in FIG. 1. As illustrated, the FC network of FIG. 1 includes two FC fabrics, a fabric no and a fabric 120. The fabric 120 includes switches 160, 162, 164 which are coupled to each other via ISLs and are each also connected to either a storage device or a computer system. For example, switch 164 is coupled to the computer system 144 and switch 162 is coupled to a storage device 142. The computer system 144 may be any suitable node device including a desktop computer, a server, or a user terminal. The FC fabric no is shown having three switches 150, 152 and 154 coupled together via ISLs. These switches are also each coupled to one or more storage devices. Switch 150 is coupled to storage devices 130 and 132, while switch 154 is coupled to storage device 136, and switch 152 is coupled to storage device 138. The switches 150 and 160 each have a router port which are connected to each other by link 170. By using router ports instead of typical E_Ports, the fabrics 110 and 120 stay separate and do not merge into a single fabric.

Each of the storage devices shown in FIG. 1 may be any suitable node device including a JBOD (Just a Bunch of Disks), RAID (Redundant Array of Inexpensive Disks) array, tape library, or network data store. Each of the switches may have as few as two and as many as 256 or more ports.

As illustrated in FIG. 1, FC networks can be complex. As such, diagnosing possible errors or faulty links in these networks can be challenging. To more efficiently troubleshoot large networks and improve the speed, efficiency, and reliability of the networks, the inventors provide a method of diagnosing potential problems in inter-switch links using diagnostic ports ("D_Port").

D_Ports are ports that are configured by the user for the purpose of running diagnostics. In a preferred embodiment of the present invention, any FC port can be configured as a D_Port. However, once a port is configured as a D_Port, it will no longer be part of the fabric as it will not carry any inter-switch or data traffic. A D_Port will also not merge fabrics. The D_Port is only used for link diagnostic purposes and to isolate link level faults.

Accordingly, a D_Port is configured to run one or more link level diagnostic tests with minimal user intervention and provide comprehensive test results. The diagnostic tests performed by a D_Port achieve one or more of the following: 1) test both ends of a link's connectivity to validate that the link is within dB budget; 2) saturate a link with a representative SAN traffic profile to validate fabric performance; and 3) monitor and determine trends for the integrity of the optics during its operational life cycle.

In a preferred embodiment of the present invention, two different software modules are used. The operation and configurability of D_Ports are handled by the fabric module. In the preferred embodiment, the fabric module implements the Fibre Channel Switch Fabric (FCSF) standard. The fabric module follows the FCSF standard for fabric initialization processes, such as determining the E_ports, assigning unique domain IDs to switches, throttling the trunking process, and distributing the domain and alias list to all switches in the fabric. The fabric module also performs D_Port related operations such as reading small form-factor pluggable (SFP) capabilities and sending out state change notices (SCNs) of the D_Port to notify other modules in the preferred embodiment. The fabric module performs some of these D_Port related operations through the use of switch drivers. The diag module is the diagnostics module and implements the spinfab CLI command.

In some embodiments, D_Port diagnostics may be performed on E_ports connected to ISLs between network switches in the fabric. In other embodiments, D_Port diagnostics may be performed on F_ports connected to links to N_ports on devices. In yet other embodiments, D_Port diagnostics may be performed on E_ports, F_ports, and N_ports. For clarity, the discussion below is typically written in terms of, D_Port diagnostics using E_ports, but similar techniques may be used for, D_Port diagnostics in F_ports and N_ports. Some of these conditions may only apply to E_ports, while others may only apply to F_ports or N_ports, and others may apply to any port.

Figure 2:
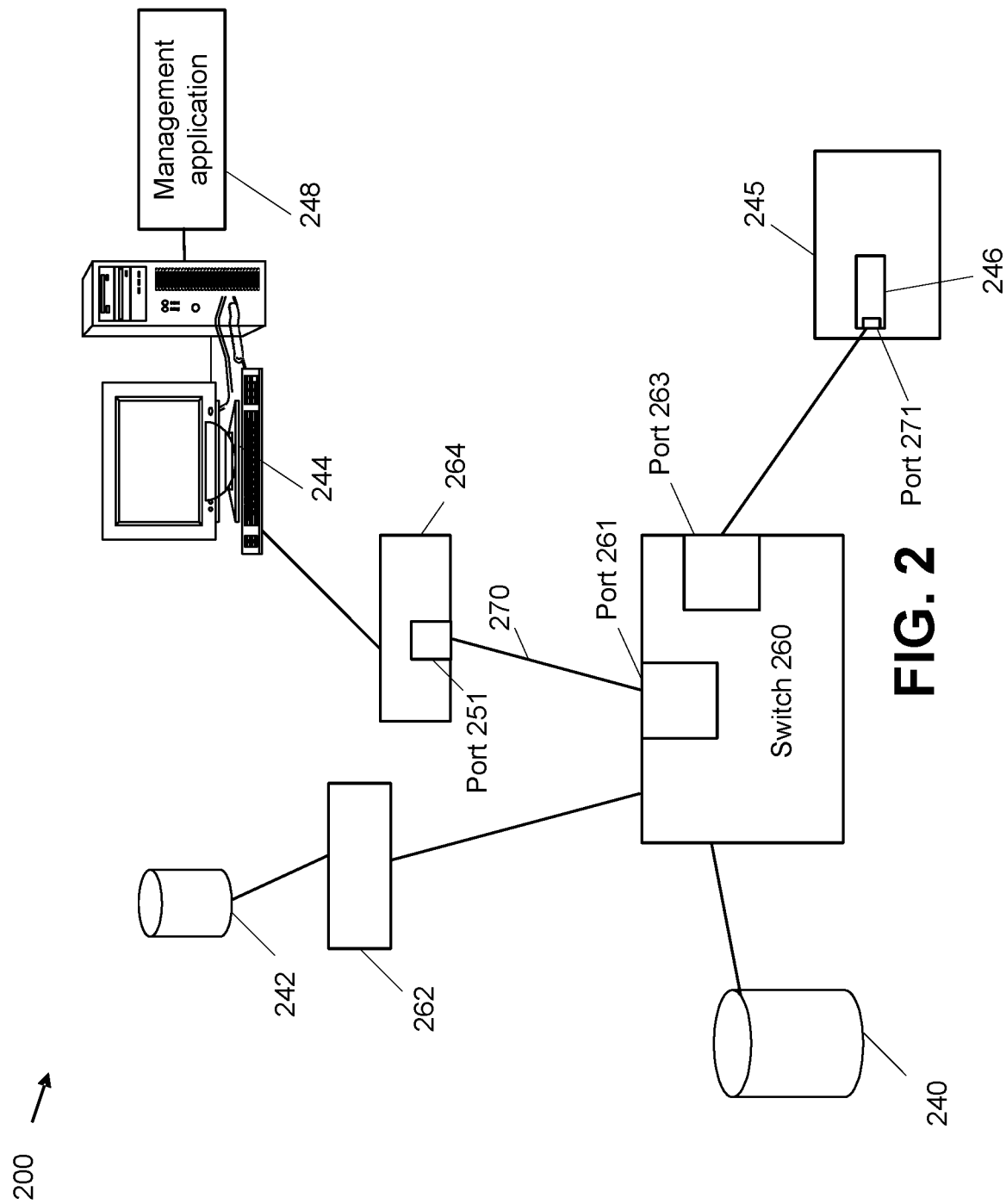
FIG. 2 is a block diagram illustrating an exemplary Fibre Chancel network implementing D_Port diagnostics according to one embodiment.

FIG. 2 is a block diagram illustrating a FC network which implements one embodiment of the use of D_Ports. FIG. 2 illustrates switches 260, 262 and 264. Each of these switches is coupled to one or more storage devices or computer systems. For example, switch 264 is coupled to the computer system 244, switch 262 is coupled to the storage device 242, and switch 260 is coupled to the storage device 240. Some of the switches are also coupled to each other through ISLs. For example, switch 260 is coupled through ports 261 and 251 to switch 264. Switch 260 includes a port 263 connected to port 271 of a host bus adapter (HBA) 246 in a host or server 245. This link will be described as a node link to distinguish it from an ISL.

Although illustrated in FIG. 2 as a single chassis, the switches 260 and 264 may comprise a plurality of network switches in one or more chassis. In the network 200, hosts and devices are connected into a SAN using the switches. (The numbers of storage devices and switches are illustrative and by way of example only, and any desired number of storage devices and switches may be connected in the network 200.)

As can be seen in FIG. 2, the connections between the switches create inter-switch links. As such, switches 264 and 260 are coupled to each other through the inter-switch link 270. Each of the inter-switch links can be diagnosed in accordance with the preferred embodiment of the present invention. For example, the inter-switch link 270 can be diagnosed to detect potential faults and validate inter-switch connectivity. To do this the two ports at each end of the link would first need to be configured as D_Ports. The exemplary steps involved in configuring the ports as D_Ports are illustrated in the flow chart of FIG. 4.

FIG. 3A illustrates a basic block diagram of a switch 250, such as switches 260, 262, or 264 according to the preferred embodiment of the present invention. A processor and I/O interface complex 202 provides the processing capabilities of the switch 250. The processor may be any of various suitable processors, including the Freescale or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor. Preferably the flash memory 210 contains an operating system used to control the switch and various modules that control the Fibre Channel circuits 214 and 216 and the media interfaces 220, and to manage the diagnostic according to the present invention and described herein.

The processor complex 202 also includes an I/O bus interface 212, such as a PCI bus, to connect to Fibre Channel circuits 214 and 216. In one embodiment, the processor 202 runs the modules used in performing the diagnostics tests of the present invention. The Fibre Channel circuits 214, 216 in the preferred embodiment each contain eight Fibre Channel ports. Each port is connected to an external SERDES circuit 218, which in turn is connected to a media interface 220, conventionally an SFP, which receives the particular Fibre Channel medium used to interconnect switches used to form a fabric or to connect to various devices. SFPs according to the present invention include optical loopback capabilities to allow incoming frames to be looped back out within the SFP itself, rather than requiring a receiving ASIC to perform the looping within the necessary electro-optical conversions. Further, SFPs according to the present invention include internal electrical loopback capabilities to allow near end testing. The processor 202 uses the fabric module to communicate with the SFPs to set both the electrical and optical loopback modes.

Figure 3B:
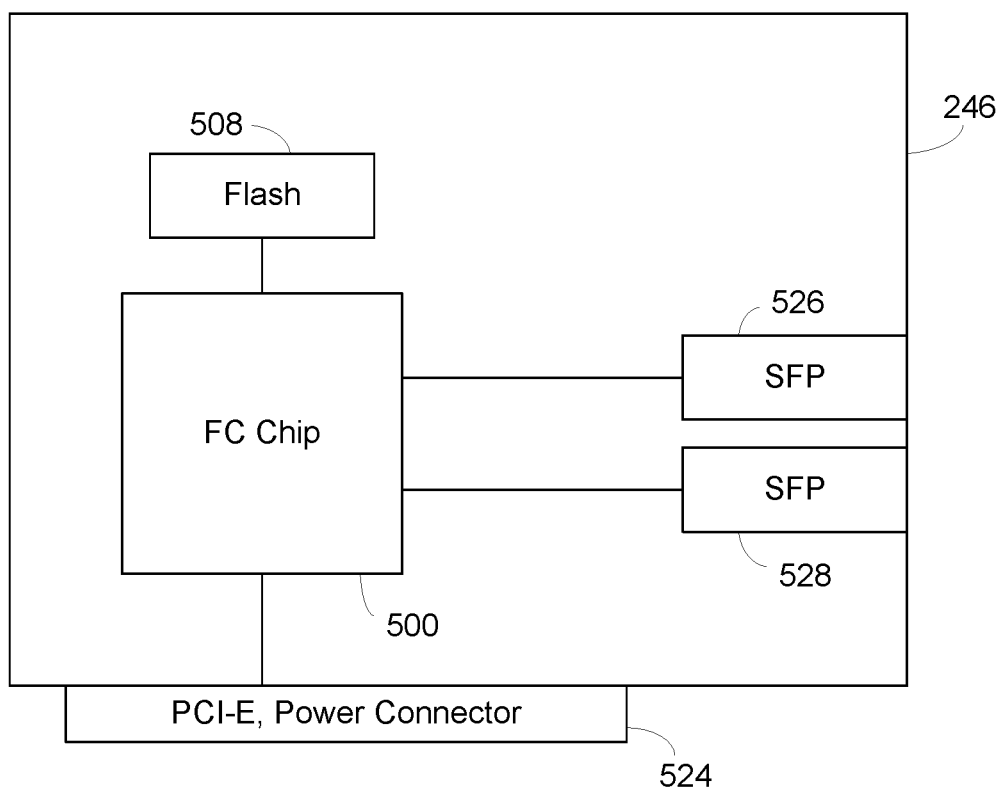
FIG. 3B is a block diagram of an exemplary host bus adapter.

FIG. 3B illustrates an exemplary HBA 246. An FC chip 500 is connected to a PCI-E and power connector block 524 for communication of PCI-E signals, power and clock. The FC chip 500 is also connected to SFP module blocks 526 and 528. The SFP modules receive optoelectronic converters for use with fiber optic cabling, as commonly used in Fibre Channel. Flash memory 508 holds the firmware for the CPUs, which are embedded in the FC chip 500. For various embodiments the flash memory 508 contains the firmware, the equivalent to the relevant portion of the fabric module and switch drivers of the switches, to allow D_Port operations as described below. In other embodiments the software to perform the D_Port operations is split between the firmware and a host driver which is executing on the host system and its processor.

Figure 3C:
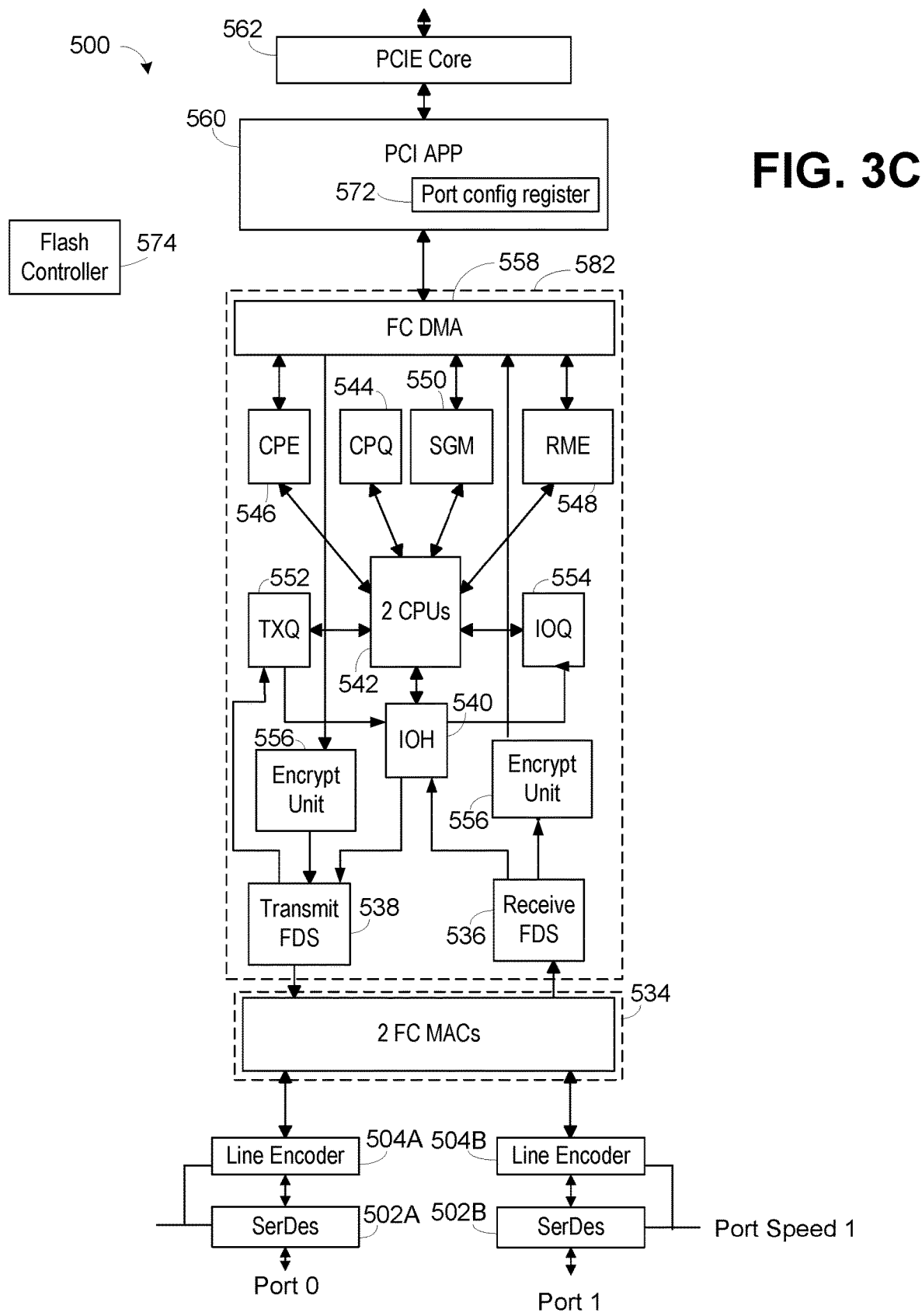
FIG. 3C is a block diagram of the FC chip of FIG. 3B.

FIG. 3C illustrates a detailed block diagram of the FC chip 500. The FC chip 500 is formed by various modules. They are briefly listed below in table form, with more detailed description following the table.

TABLE 1

Description of the FC chip 500 modules

| | |
|---|---|
| Serdes 502 | Serializer/deserializer that can be configured as 16/8/4/2/1G FC. |
| Line Encoder 504 | Performs 8b/10b or 64b/66b encoding and decoder, depending on protocol and speed. 8/4/2/1G FC uses 8b/10b. 16G FC uses 64b/66b. |
| FC MAC 534 | This block contains the FC MAC for traditional 16/8G FC. It also contains the XFM which is the 10G/14G FC MAC. |
| Rx FDS 536 | This holds the inbound FC frames received from RxA or from the FC MAC that are headed towards the IOH/CPU. |
| Tx FDS 538 | This holds the outbound FC frames that need to be transmitted to the FC MAC. |
| IOH 540 | This block maintains the IO State Table that holds the context for the FC IOs. It interfaces with a number of other blocks (IOQ, FDS, CPU, TxQ). |
| CPU0/1 542 | These are two on-chip CPUs that are used for a number of purposes including initialization of the FC chip 300, setting up and tearing down of FC IOs, handling of exceptions, processing management frames, such as D_Port operations, and so on. The firmware for the CPUs is stored in off board flash memory 508. |
| CPQ 544 | This holds all the event queues that need CPU processing. CPQ interfaces with a number of blocks on the FC side to route events to the CPUs. |
| CPE 546 | This is the Command Prefetch block that interfaces with the host and DMAs commands to the CPUs for further processing. |
| RME 548 | This is the Reply Message block that is used by the CPU to send IO completion information to the host. |
| SGM 550 | This block holds the scatter-gather elements for all the IOs processed by the CPU and IOH. It performs DMAs to the host to prefetch/fetch scatter gather vectors. |
| TxQ 552 | This structure holds all the queues and frame related information for Tx frames which are headed towards the FC MAC. |
| IOQ 554 | This block contains all the IO related queues that are directed towards the host, for FC frames. |
| Encrypt Unit 556 | This block contains encryption/decryption logic to perform encryption and decryption operations if needed. |
| FC DMA 558 | This block contains all the upstream and downstream data DMA engines that transfer frames from the FDS to the host or vice-versa. |
| PCI APP 560 | This collects DMA requests from FC-DMA and sends them to the PCI-E core. It routes completions for these requests back to the FC-DMA. It contains the SR-IOV related structures and logic that present a virtualized chip to the PCI-E. It interfaces to the PCI-E core. |
| PCI-E core 562 | This is the SR-IOV PCI-E core that has the Adaptation, Translation, Link and Physical Layer functionality for PCI-E bus transfers to/from the host. |

The PCI APP 560 provides the PCI-E interface to the FC chip 300. It can act as PCI-E Master and initiate DMA transfers. It can also function as a PCI-E Target for host accesses. The PCI APP 560 hides all the PCI-E complexity from the rest of the chip 300. It interfaces with PCI-E core 562 on one side and chip blocks on the other side and supports the following features:

High-Bandwidth data path to and from the host memory.
Cross-clock synchronization between System Clock and PCI-E Clock domains.
Supporting outstanding Memory Read Requests on PCI-E interface.
Supporting Max Read Request Size of 2 k bytes.
Supporting Max Payload Size of 2 k bytes.
Accepting 2 k byte aligned Memory Write requests from the DMA block.
Providing the register interface for host programming.
Providing Host-Local CPU Mailboxes.
Providing the shared interface to the rest of the chip for all four functions.

The PCI-E APP 560 connects the PCI-E core 562 to the FC DMA block 558. The SGM block 550 is connected to the FC DMA block 558 and the CPUs 542. The FC DMA block 526 allows for bus mastering in the FC chip 300, i.e., to move data to and from the host memory.

An I/O command is fetched via the PCI-E core 562 and PCI-E APP block 560 by the FC DMA block 558, which forwards the command to the CPQ block 544. Two Fibre Channel media access controllers (MACs) 534 provide an interface to a SAN fabric. An upstream path between the FC MACs 534 and the PCI-E APP block 560 comprises receive buffers in a receive frame data storage unit (RX FDS) block 536, an encryption unit 556, and the FC DMA block 558. A downstream path between the FC MACs 534 and the PCI-E APP block 560 comprises the FC DMA block 558, an Encryption Unit 556, and transmit buffers in a transmit frame data storage unit (Transmit FDS) block 538. The Tx FDS block 526 and the Transmission FDS block 538 communicate with the CPUs 542, and the Transmit FDS block 538 additionally communicates with the transmission queue (TXQ) block 552. A crossbar I/O handler (IOH) block 540 receives data from the FC MACs 534 and communicates with the Transmit FDS block 538, the CPUs 542, and the IOQ block 554. The IOQ block 554 communicates with the IOH block 540, the FC DMA block 558, and the CPU queue (CPQ) block 544. The CPQ block 544 receives data from the IOQ block 554, the TxQ block 552, and the FC DMA block 558, and transmits data to the CPUs 542.

Figure 4:
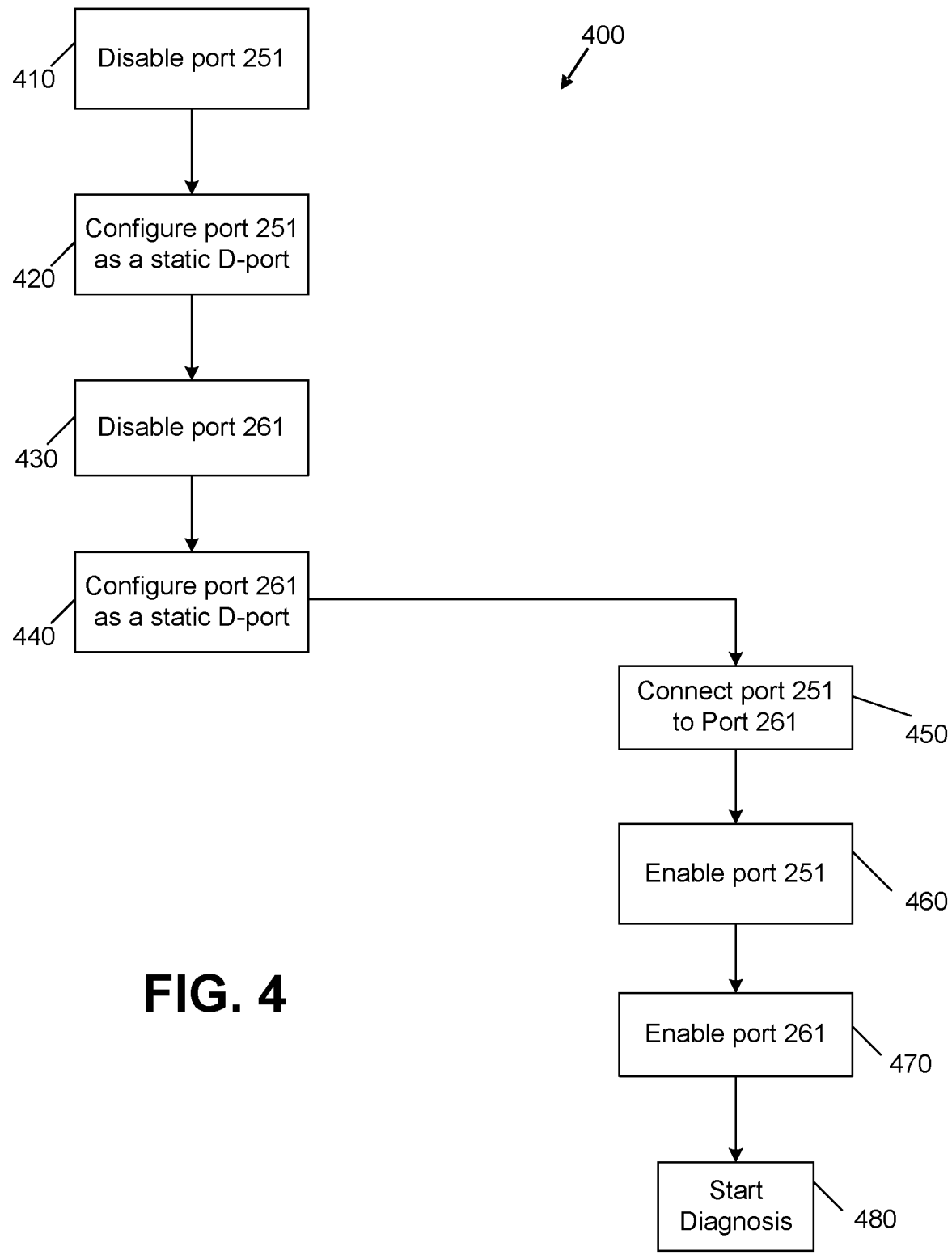
FIG. 4 is a flowchart illustrating a method for configuring switch ports as D_Ports according to one embodiment.

As illustrated in FIG. 4, the method 400 starts at step 410 by disabling port 251. This is done so that the port is no longer part of the fabric and cannot carry data traffic. After the port has been disabled, the method goes on to configure port 251 as a static D_Port, in step 420. After port 251 has been configured as a D_Port, the next step is to disable and configure port 261 as a static D_Port in steps 430 and 440, respectively. After both ports have been configured as D_Ports, the method connects port 251 to port 261. When the two ports are connected, the method enables port 251 and port 261, at steps 460 and 470, respectively. In one embodiment, when both ports 251 and 261 have been have been enabled, the method is ready to start diagnosis at step 480. In another embodiment, the diagnostic tests will start automatically when the second port is enabled.

In one embodiment, the method 400 can be initiated by a user (e.g. a network administrator) through an application 248 accessed on an administrative workstation such as the computer system 244 of FIG. 2. The application 248 may include one or more user interfaces or GUIs (not shown) that enable the user to identify the ISL intended to be diagnosed and turn on a diagnostic mode. Turning on the diagnostic mode may start running the method 400 automatically on the identified ISL. In other embodiments, the user may initiate each step of the method 400. In one embodiment, the user is able to decide which diagnostic tests to run on the ISL. After the diagnostic tests have been performed, the result may be presented to the user for analysis.

The application 248 may be provided on any desired non-volatile computer-readable program storage media including, but not limited to, all forms of optical and magnetic, including solid-state, storage elements, including removable media. The application workstation 244 may be any desired type of computational device, including a virtualized computer executing on any real hardware platform desired.

In addition to using the application 248, D_Port diagnostics may use a command line interface (CLI) implemented on one of the switches 260 or 264 to allow the user to initiate the diagnosis. In such an embodiment, the diagnosis can be initiated using a port identifier as a parameter to the diagnostic command. The process may include querying the switches in the network 200 for the list of ports and then sending D_Port diagnostic requests for the selected ports. The diagnostic command may block waiting for completion of the diagnostic request. The command may also result in a message indicating successful or unsuccessful completion of the diagnostic tests and/or displaying the test results.

The diagnostics tests initiated at step 480 of method 400 include one or more of the following tests: 1) electrical loopback test; 2) optical loopback test; and 3) link traffic test. In one embodiment, a test initiator port, such as the port 510 illustrated in FIG. 5, initiates the diagnostic tests, while a port at the other end of the link, referred to as the test responder 520, responds. In one embodiment, the ports are designated as an initiator or responder based on a predetermined characteristic of the ports such as their World Wide Name (WWN). For example, the port having a higher WWN may be designated as the initiator, while the port having a lower WWN may get designated as the responder. In another embodiment the initiator status is set by user command, allowing either port to be an initiator.

Figure 5:
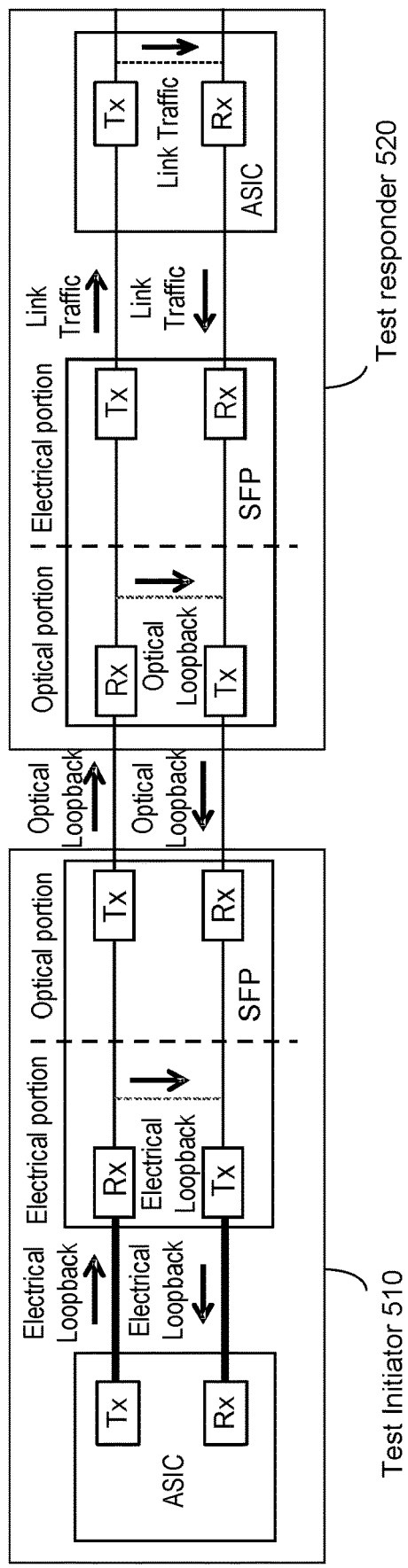
FIG. 5 is a block diagram illustrating the D_Port diagnostic tests performed on links according to one embodiment.

As illustrated in FIG. 5, the electrical loopback test can occur at either the initiator or responder ports locally. In contrast, the optical loopback and the link traffic tests depend on the remote port to send the test frames back and should be performed using the remote port as well as the local port. In one embodiment, in order to perform the link traffic test both local and remote ports should be programmed to retransmit the frames received on that port. During the test, millions of test frames are injected into the local port transmit circuit. These frames are transmitted onto the link through the local SFP. The remote port receives the frames from the remote SFP and retransmits them back to the source port. The received frames are then checked for any errors.

In one embodiment, the link level tests involve an FC test utility referred to as spinfab. Spinfab is an online diagnostics command that can verify ISL links between switches at the maximum speed. The test is done by setting up the routing functionality in the hardware such that test frames received by an E_Port are retransmitted on the same E_Port. Several frames are then sent to ports attached to each active E_Port specified. These frames are special frames which never occur during normal traffic and the default action for such frames is to route them back to the sender. The frames are circulated between switches until the test stops them. The fabric module relies on the diag module for running spinfab.

Figure 6A:
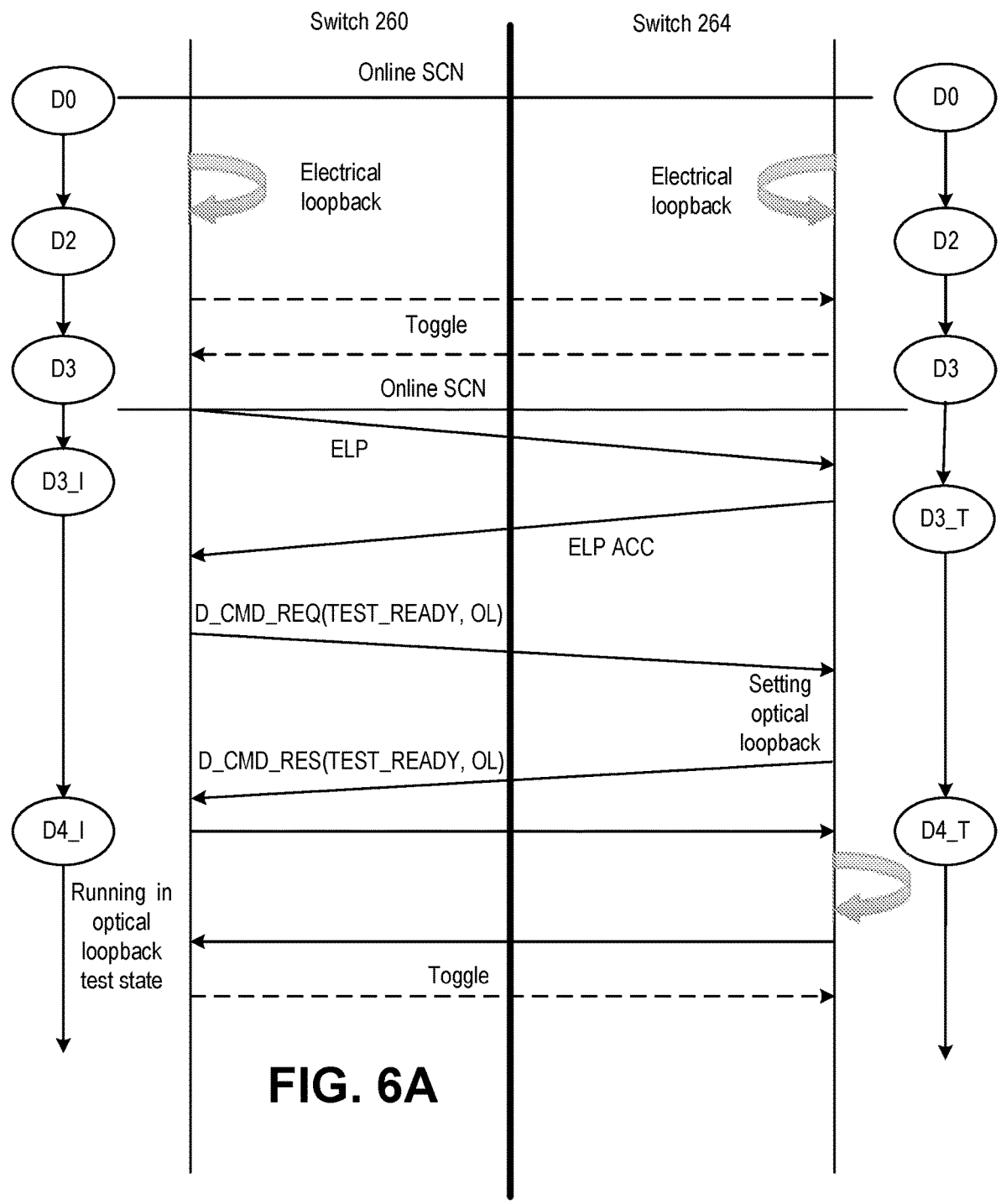
FIGS. 6A and 6B are a ladder diagram illustrating the states of D_Ports as they will go through a D_Port diagnostic according to one embodiment for an inter-switch link.
Figure 6B:
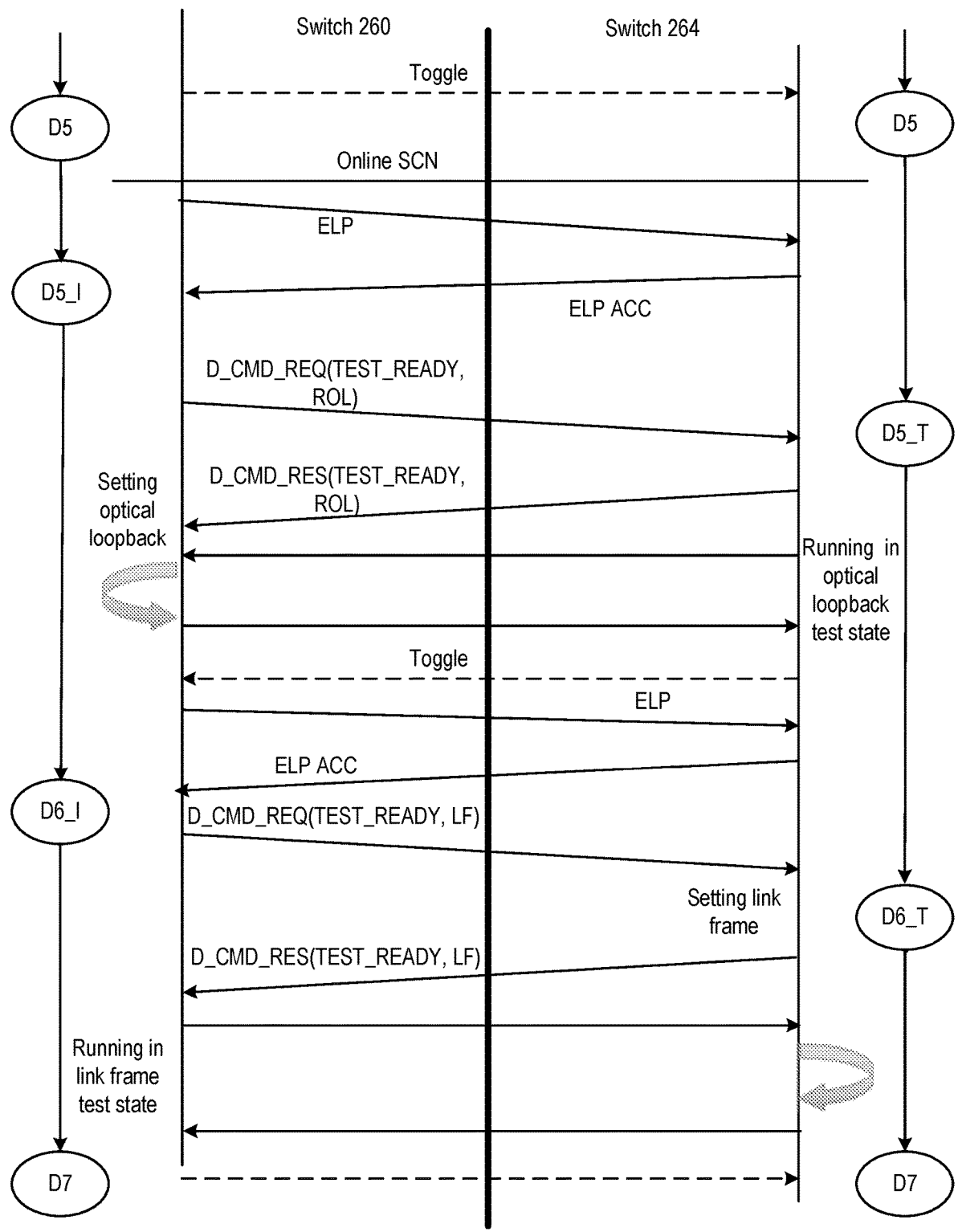
Figure 7:
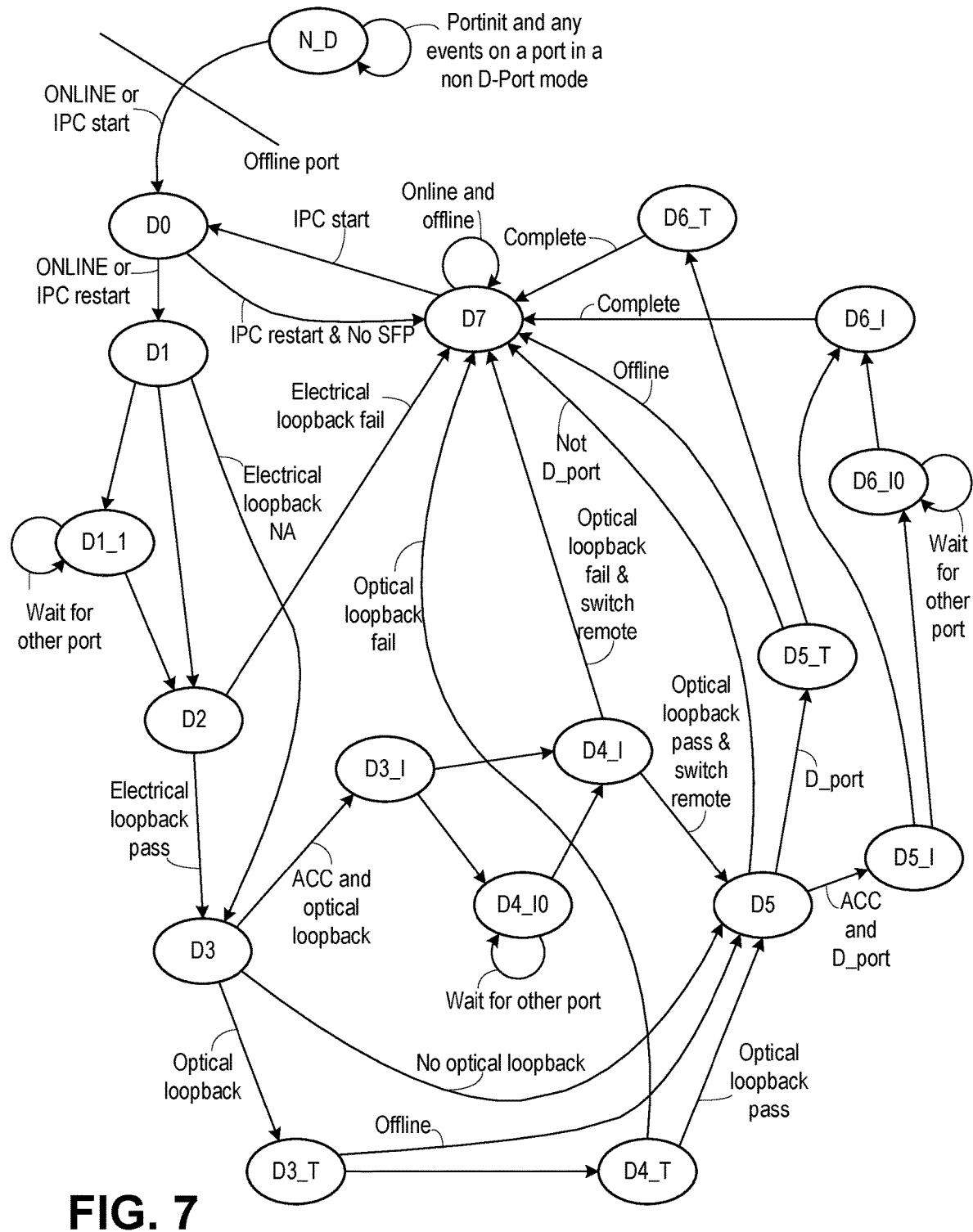
FIG. 7 is a graph diagram illustrating the states of a D_Port as it will go through a D_Port diagnostic according to one embodiment for an inter-switch link.

FIGS. 6A, 6B and 7 illustrate ladder and state diagrams, respectively, showing the state of the D_Ports during the high-level actions performed to achieve D_Port diagnosis, according to one embodiment. As illustrated in FIG. 7, the D_Port state machine will start with the state NOT_D_PORT (N_D). A port will be initialized to an N_D state after the port structure is created. When the port receives a request to start the test with the D_Port mode enabled by either an ONLINE command from the fabric module based on an instruction from a management utility to have the port go online or an inter-process call (IPC) from a management utility, such as diag using the spinfab command directing starting of the test, it will transition from N_D to D_PORT_INIT (D0). As shown in FIGS. 6A, 6B and 7, the port will remain at the D0 state until it receives an ONLINE command or an IPC call to restart the test. At this point, if an SFP module exists, the port will transition to the D_CU_LOOPBACK (D1) state to perform an electrical loopback test. However, if the port is at the D0 state and receives an ONLINE command or IPC call to restart the test while no SFP module exists, the port will transition to the D_PORT_FINAL (D7) state and no testing will be performed.

At the D_CU_LOOPBACK (D1) state, the port may transition to three different states. If the SFP is not capable of an electrical loopback, the port will be toggled and it will go directly to the D_OPTIC_LOOPBACK (D3) state. However, if the SFP supports the electrical loopback test, it will be enabled and the port will go through all the states of E-port initialization from ONLINE to AC_PORT or active. At this stage, if an AC_PORT SCN command is received from the fabric module and another port is running the link test, the port will transition to the D_CU_LOOP_WAIT (D1_1) state and wait for the other port. While at the D1_1 state, the port either waits for the other port to complete the link test or the switch goes through fabric reconfiguration. In either case, the port will transition from D1_1 to the D_CU_LOOP_TEST (D2) state. The port may also directly transition from D1 to D2, if an AC_PORT SCN is received and no other port is running the link test.

While at the D2 state, the procedure will start the electrical loopback test and will enable a child process completion signal. The procedure will also start a timer for worst case scenario, in case the test does not complete. If the electrical loopback test fails or is aborted due to timeout, the port will transition from D2 to the D7 state and the diagnostic test will be stopped by setting the completion code to failure code. However, if the electrical loopback test is completed successfully, the port will transition from D2 to the D_OPTIC_LOOPBACK (D3) state. At this point, the electrical loopback will be cleared and the port will be toggled by the fabric module to indicate to the other port that the test has completed successfully.

At the D3 state, if the external cable is connected and the remote port SFP is capable of optical loopback, the port will perform an optical loopback test by going through all the states of E-port initialization from ONLINE to AC_PORT. At this point, the initiating port sends an exchange link parameters (ELP) command and moves to state D3_I. The responding port returns an ELP ACC and moves to state D3_T. Next the initiating or sending port sends a D_CMD_REQ(TEST_READY, OL) to indicate the desire to do an optical loopback test. The responding or remote port sets the SFP for optical loopback mode. When the SFP is ready, port responds with a D_CMD_RES(TEST_READY_OL) to indicate that the SFP is ready for the optical loopback testing. The ports move to states D4_I and D4_T respectively to perform the optical loopback testing. However, if either SFP does not support optical loopback while in D_Port mode or both ports are not exchanging ELP and ELP ACC, the procedure will not be able to perform an optical loopback and the port will transition to the D_REM_LOOPBACK (D5) state.

At the D3_I state, the port may transition to two different states. If AC_PORT SCN is received and no other port is running the link test, the port will transition to the D_OPTIC_LOOP_BACK_TEST_INIT (D4_I) state. However, if AC_PORT SCN is received and another port is running the optical loopback link test, the port will transition to the D_OPTIC_LOOP_BACK_INIT_WAIT (D4_Io) state and wait in that state. At the D4_Io state, the port is either waiting for another port to complete the link test or the switch is going through fabric reconfiguration. The port will remain in the D4_Io state until either DOMAIN_VALID SCN is received or the other port completes the link test. Either one of those conditions will cause the port to transition from the D4_Io state to the D4_I state. While at the D4_I state, the port will determine whether or not the optical loopback test was completed successfully. To do this, the port will start the optical loopback link test, enable child process completion signal, and start a timer for worst case scenario, in case the test does not complete successfully. If the port determines that the optical loopback test has failed or was aborted due to timeout, it will set a failure code and will transition back to D7. However, if it determines that the optical loopback test has completed successfully, it will toggle the port and transition to the D_REM_LOOPBACK (D5) state. It is noted that the toggling is illustrated in both FIGS. 6A and 6B to allow reference between the two figures.

Going back to the D3_T state, while at that state, the port is the target of the optical loopback test and will either proceed to the D_OPTIC_LOOP_BACK_TEST_TARGET (D4_T) state when an AC_PORT SCN is received or transition to the D5 state if it receives an offline SCN. At the D4_T state, the port will wait for an indication that the optical loopback test has completed, enable child process completion signal, and start a timer for worst case scenario, in case the test does not complete. If the port determines that the optical loopback test has failed or was aborted due to timeout, it will set a failure code and will transition back to D7. However, if it finds that the optical loopback test has completed successfully, as indicated by the toggling, it will transition to the D5 state.

When the port goes to the D5 state the port will then go through all the states of E_port initialization from ONLINE to AC_PORT, if the external cable is connected. Next the initiator port will send an ELP, which the remote port will reply to with an ELP ACC. From the D5 state, the port may transition to three different states. If the port is the initiator and the ELP ACC was not received, the port will return to state D7. If the ELP ACC was successfully received, the port will transition to state D5_I, where it can commence a remote optical loopback. If the port is the remote port, it will transition to state D5_T. When the initiator port receives the ELP ACC, it begins the process for remote optical loopback and sends a D_CMD_REQ(TEST_READY, ROL) to indicate it is ready to start the handshake for the remote optical loopback. At this time the remote port transitions to state D5_T and replies with a D_CMD_RES(TEST_READY, ROL) to indicate it will begin the remote optical loopback test. When the initiator port receives the D_CMD_RES (TEST_READY, ROL) it sets its own SFP for optical loopback. The remote port then executes the optical loopback test. When completed, the remote port toggles to indicate completion.

From the D5_I state, the initiator port will either transition to the D_REM_LOOP_BACK_TEST_INIT (D6_I) state or to the D_REM_LOOP_BACK_INIT_WAIT (D6_Io) state. If an AC_PORT SCN is received and no other port is running the link test, then the port will move to the D6_I state. However, if an AC_PORT SCN is received and another port is running the link test, the port will then transition to D6_Io. The port will remain at the D6 Io state until either a DOMAIN_VALID SCN command is received or the other port completes the link test. In either case, the port will transition from D6_Io to the D6_I state. At the D6_I state, the initiator port sends a D_CMD_REQ(TEST_READY, LF) command to indicate a desire to start the link traffic test. The remote port transitions to state D6_T and sets itself for the looping needed to perform the link traffic test. When set, the remote port sends a D_CMD_RES(TEST_READY, LF). The initiator port link traffic test procedure starts the link test, enables a child process completion signal, and starts a timer for worst case scenario, in case the test does not complete. When the link traffic test completes and the large number of frames have been sent, the initiator port toggles to indicate completion to the remote port. The initiator port will transition from D6_I to D7 whether test is complete or not. If the test fails, the port will transition with the failure code enabled. Otherwise it will transition with the failure code disabled. On the toggle the remote port will move to state D7 for completion.

The D7 state is the final state after the tests are completed. There will be a completion code associated with this state. The completion code will be SUCCESS if all the applicable tests completed successfully; otherwise it will contain the failure code, which will be passed to the CLI and will also be displayed as such.

A D_Port will go through all the steps associated with E-port initialization up to link reset in LOOPBACK states. The usual E-port initialization protocol steps performed after link reset will be skipped for a D_Port. During the electrical and optical loopback and link traffic testing, very high numbers of frames are circulated. The port counts the numbers of frames circulated in each to measure the link traffic.

The D_Port diagnostic tests can be performed on long distance ports across two different fabrics, and the D_Port tests can be performed without merging the fabrics. This can be done a single-mode fiber connecting the long-wave SFPs or through DWDM links.

As noted above, any FC port can be configured as a D_Port. Following here are embodiments where an HBA port is configured as a D_Port and cooperates with a switch port configured as a D_Port. Three different embodiments are described, one where the HBA port is not configured as a D_Port but provides many of the functions of a D_Port, a second where the switch D_Port is statically configured and the HBA port is dynamically configured as a D_Port and a third where both the switch port and the HBA port are dynamically configured as D_Ports.

Figure 8:
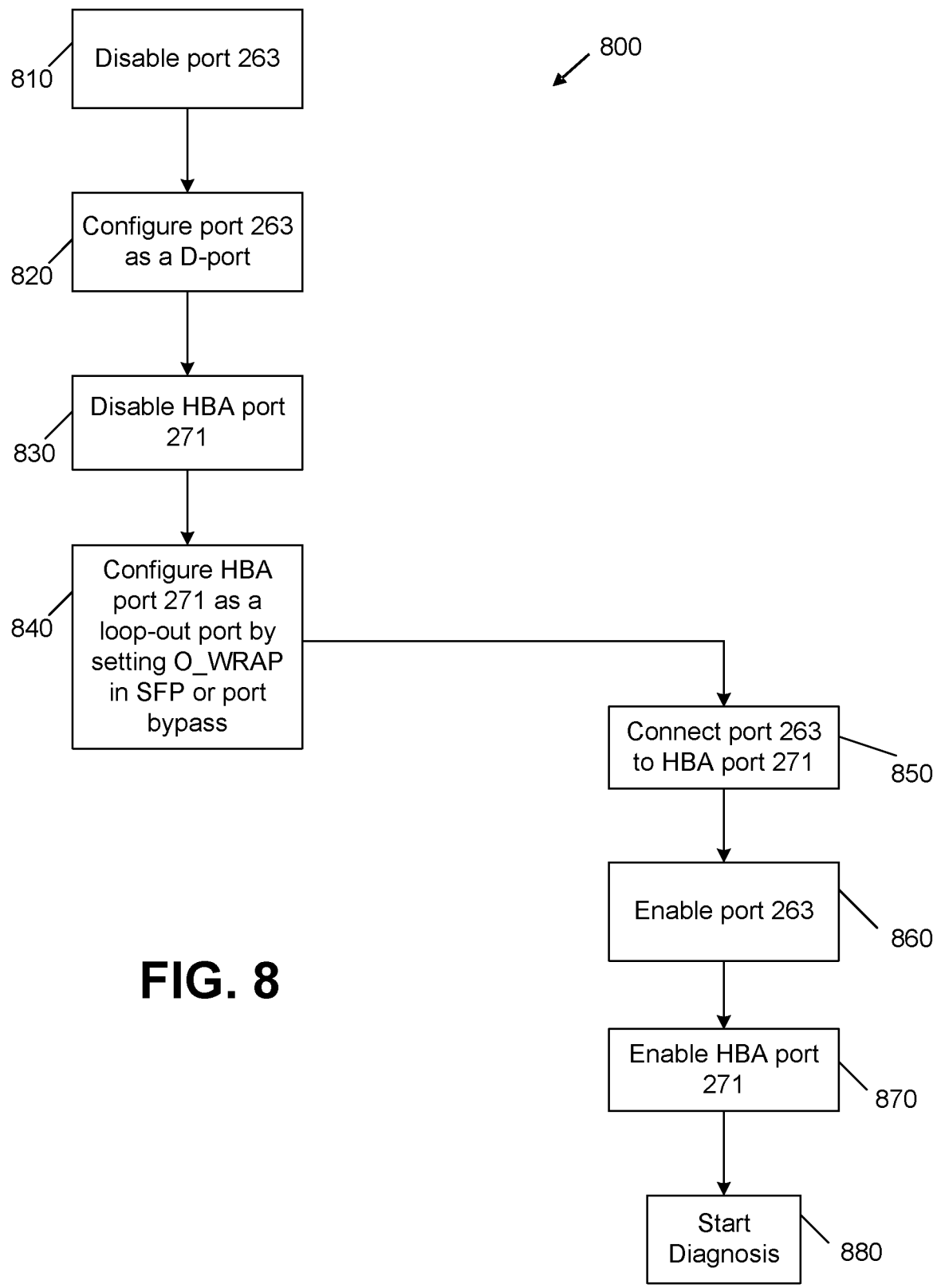
FIG. 8 is a flowchart illustrating a method for configuring a network port as a D_Port and an HBA port to cooperate according to one embodiment.
Figure 9:
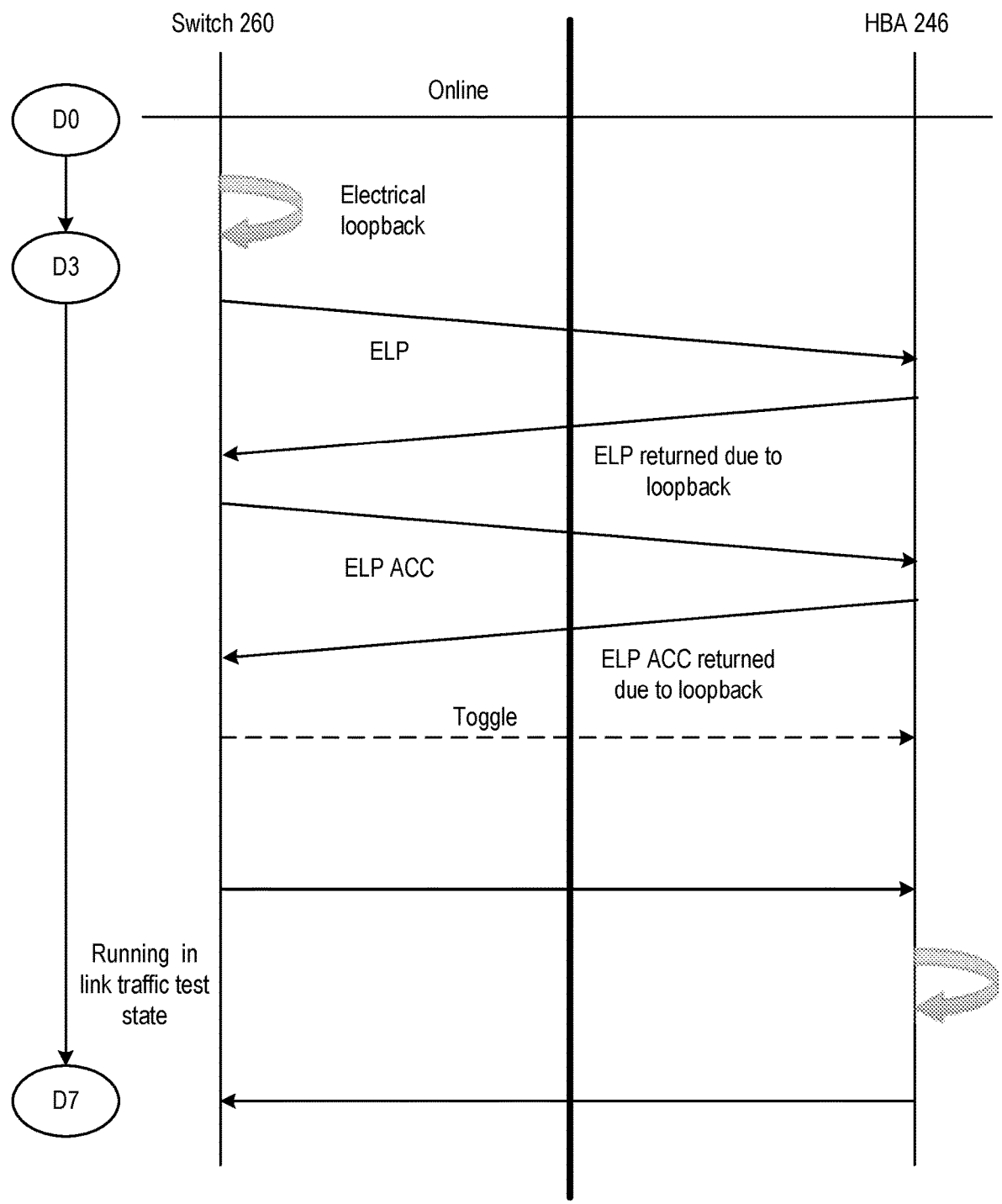
FIG. 9 is a ladder diagram illustrating the states of a D_Port as it will go through a D_Port diagnostic according to one embodiment for a node link.

FIGS. 8 and 9 describe the first HBA embodiment. In step 810 the switch port 263 is disabled. In step 820 the switch port 263 is configured as a D_Port. In step 830 the HBA port 271 is disabled. In step 840 the HBA port is configured as a loop-out port by setting O_WRAP in the SFP or otherwise setting the port in port bypass mode. In step 850 ports 263 and 271 are connected. In step 860 port 263 is enabled. In step 870 HBA port 271 is enabled, so that in step 880 diagnostic operation can begin. Those operations are shown in ladder format in FIG. 9. The ladder starts with both ports being online. The switch port 263 starts in state D0, where electrical loopback operations are performed. When the operations are completed, state advances to D3 and an ELP command is provided. As the HBA port 271 is in loopback mode, the ELP command is simply returned back to the switch port 263. This results in the switch port 263 providing an ELP ACC, which again is looped back. When this second communication is detected as being looped back, the switch port 263 is set to link frame mode and toggled to reset the port. The switch 264 clears its error counters for that port and then initiates the link traffic test, where a very large number of frames are transmitted and then looped back by the HBA port 271. When sufficient frames have been sent, the error counters are checked and results are provided. While the link is tested and at least some results are provided, many other parts of the HBA 246 are not tested.

Figure 10:
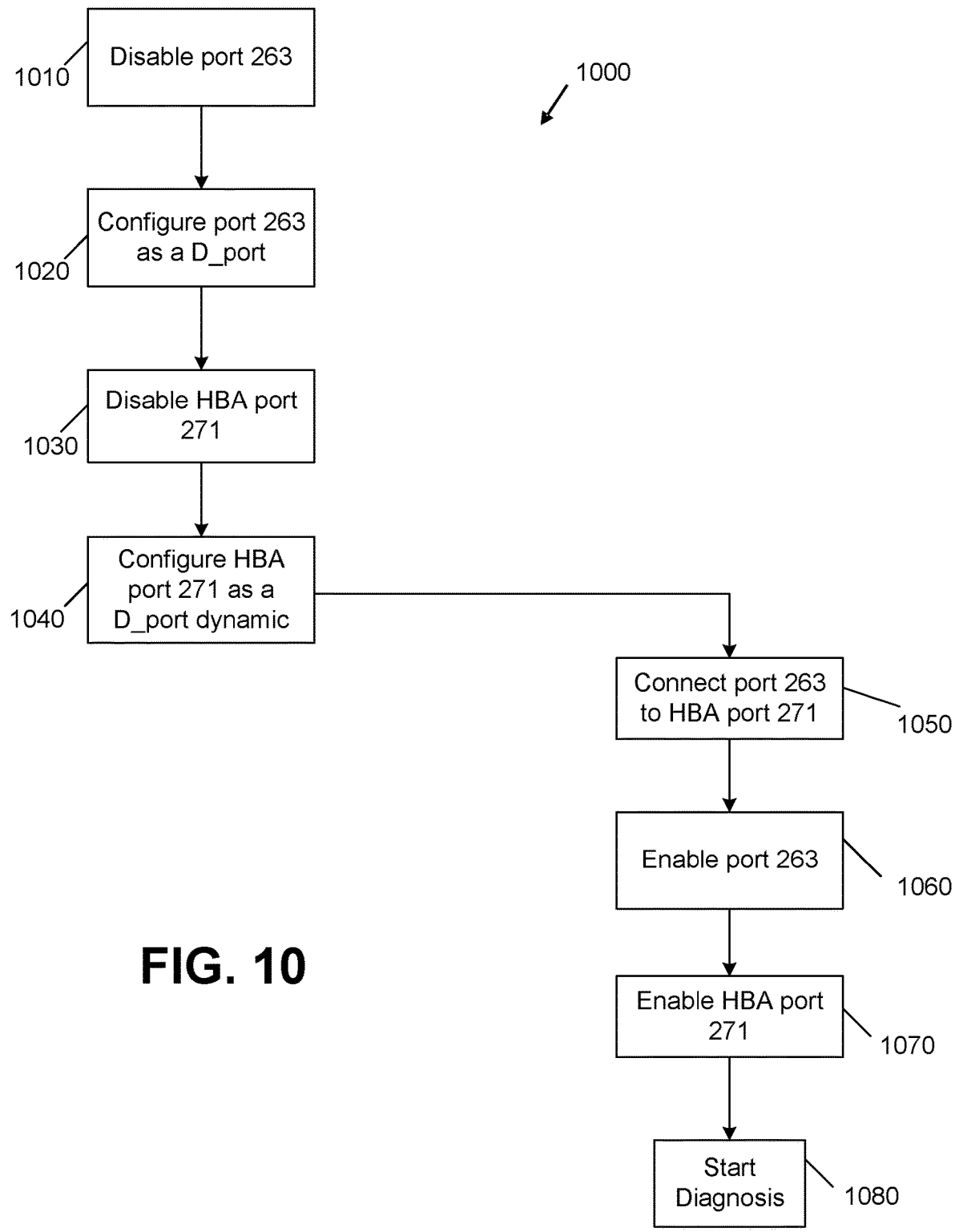
FIG. 10 is a flowchart illustrating a method for configuring a network port and an HBA port as D_Ports according to one embodiment.

FIGS. 10, 11A, 11B and 11C illustrate an embodiment that more fully tests the HBA port 271. The steps of FIG. 10 are similar to the steps of FIG. 8 except that in step 1040 the HBA port 271 is configured as a D_Port dynamic, namely on request by the management application 248 or when the connected switch port is in static D_Port mode.

Figure 11A:
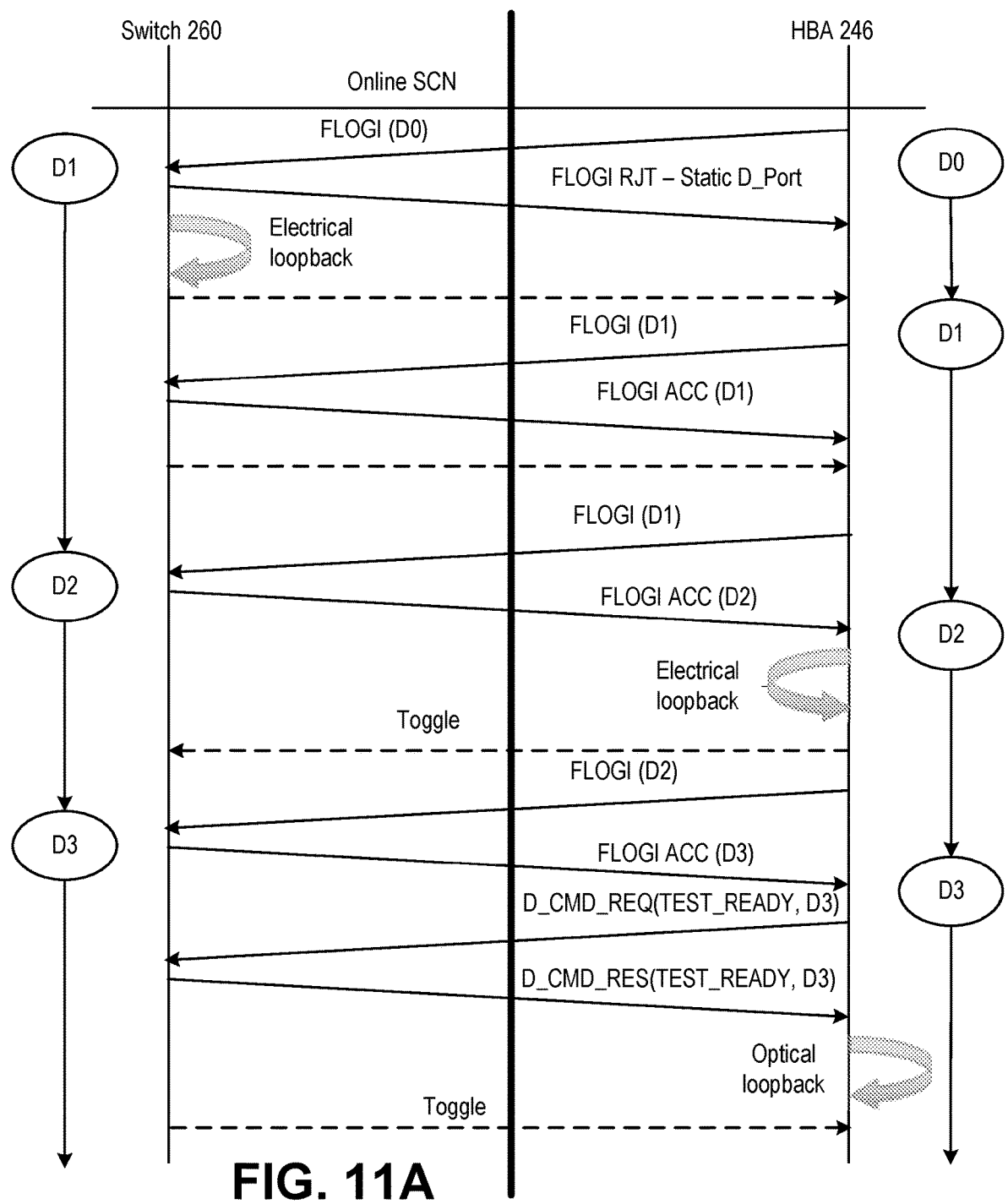
FIGS. 11A, 11B and 11C are a ladder diagram illustrating the states of the D_Ports as they will go through a D_Port diagnostic according to one embodiment for a node link.

The ladder diagram of FIG. 11A starts with both ports going online. The switch port 263 is in state D1. The HBA port 271 is in state D0 and transmits a normal fabric login (FLOGI) to log into the fabric. As shown, this is indicated by D0 in the FLOGI frame. In the preferred embodiment the FLOGI and FLOGI ACC frames are used to communicate state between the switch port 263 and the HBA port 271. In the preferred embodiment bits in the Vendor Version Level field in the FLOGI frame are used, though another option is to use flag bits in the FLOGI frame as well. When the switch port 263 receives the FLOGI D0, it responds with an FLOGI RJT, with a stated reason of Static D_Port, to indicate it is configured as a static D_Port. The HBA port 271 interprets this response as an indication to enter D_Port mode, which it does by advancing to state D1. The switch port 263 then performs electrical loopback testing. Any FLOGI frames during this testing will be ignored and eventually repeated by the HBA port 271. When the switch port 263 completes the testing, it toggles its state, which indicates to the HBA port 271 that the switch port 263 is ready to proceed, so the HBA port 271 sends an FLOGI D1 frame, indicating it is in state D1. The switch port 263 responds by returning an FLOGI ACC D1. The switch port 263 then again toggles and advances to state D2. After that toggle the HBA port 271 sends another FLOGI D1. The switch port 263 responds this time by returning an FLOGI ACC D2, indicating it is in state D2 and the HBA port 271 should advance to state D2.

In state D2 the HBA port 271 performs electrical loopback testing and then toggles on and off to indicate its completion. The switch port 263 advances to state D3. The HBA port 271 then sends an FLOGI D2 to the switch port 263 to indicate it is ready to advance. The switch port 263 returns an FLOGI ACC D3. The HBA port 271 advances to state D3 and sends a D_CMD_REQ(TEST_READY, D3) to indicate that it wishes to move forward. The switch port 263 returns a D_CMD_RES(TEST_READY, D3) to indicate that the testing will begin. The HBA port 271 configures itself for optical loopback for the next test phase. The switch port 263 next sends a very large number of frames, which are looped back, to test the link and the optics in the HBA SFP. When the optical loopback is completed, the switch port 263 toggles, indicating completion to the HBA port 271. The HBA Port 271 responds with an FLOGI D3, indicating completion of state D3. The switch port 263 advances to state D4 and returns an FLOGI ACC D4. The HBA port 271 advances to state D4 and sends a D_CMD_REQ(TEST_READY, D4) to indicate that it is ready to begin its optical loopback testing. The switch port 263 configures itself for optical loopback and returns a D_CMD_RES(TEST_READY, D4) to indicate that the testing can begin. The HBA port 271 next sends a very large number of frames, which are looped back, to test the link and the optics in the switch port SFP. When the optical loopback is completed, the HBA port 271 toggles, indicating completion to the switch port 263. As above, this toggle is shown in both FIGS. 1A and 11B for reference between the figures.

The HBA port 271 then transmits an FLOGI D4, indicating completion of state D4. The switch port 263 advances to state D5 and returns an FLOGI ACC D5. The HBA port 271 advances to state D5 and prepares itself for link traffic or port level wrap mode, so that the entire path to the relevant ASIC or chip can be tested. The HBA port 271 provides a D_CMD_REQ(TEST_READY, D5) to indicate that it is ready to move to the next phase. The switch port 263 returns a D_CMD_RES(TEST_READY, D5) to indicate that the testing will begin. The HBA port 271 configures itself for port loopback for the next test phase. The switch port 263 next sends a very large number of frames, which are looped back, to test the link, the optics in the HBA SFP and various components up to and into the chip 500. When the port loopback or link traffic test is completed, the switch port 263 toggles, indicating completion to the HBA port 271. The HBA Port 271 responds with an FLOGI D5, indicating completion of state D5. The switch port 263 advances to state D6 and returns an FLOGI ACC D6. The HBA port 271 advances to state D6 and sends a D_CMD_REQ(TEST_READY, D6) to indicate that it is ready to begin its link traffic or port loopback testing. The switch port 263 configures itself for port loopback and returns a D_CMD_RES (TEST_READY, D6) to indicate that the testing can begin. The HBA port 271 next sends a very large number of frames, which are looped back, to test the link, the optics in the switch port SFP and into the ASIC. When the port loopback is completed, the HBA port 271 toggles, indicating completion to the switch port 263.

The HBA port 271 then sends an FLOGI D6. The switch port 263 advances to state D7, the last state, and responds with an FLOGI ACC D7. The HBA port 271 advances to state D7 and provides a D_CMD_REQ(Results), which contains the results of the testing done on its end. The switch port 263 replies with a D_CMD_RES(Results), to provide its results to the HBA 246.

Thus, when the HBA port 271 is configured in D_Port dynamic mode, full testing of the connection, as done with the ISL D_Port configuration, can be performed.

Figure 11B:
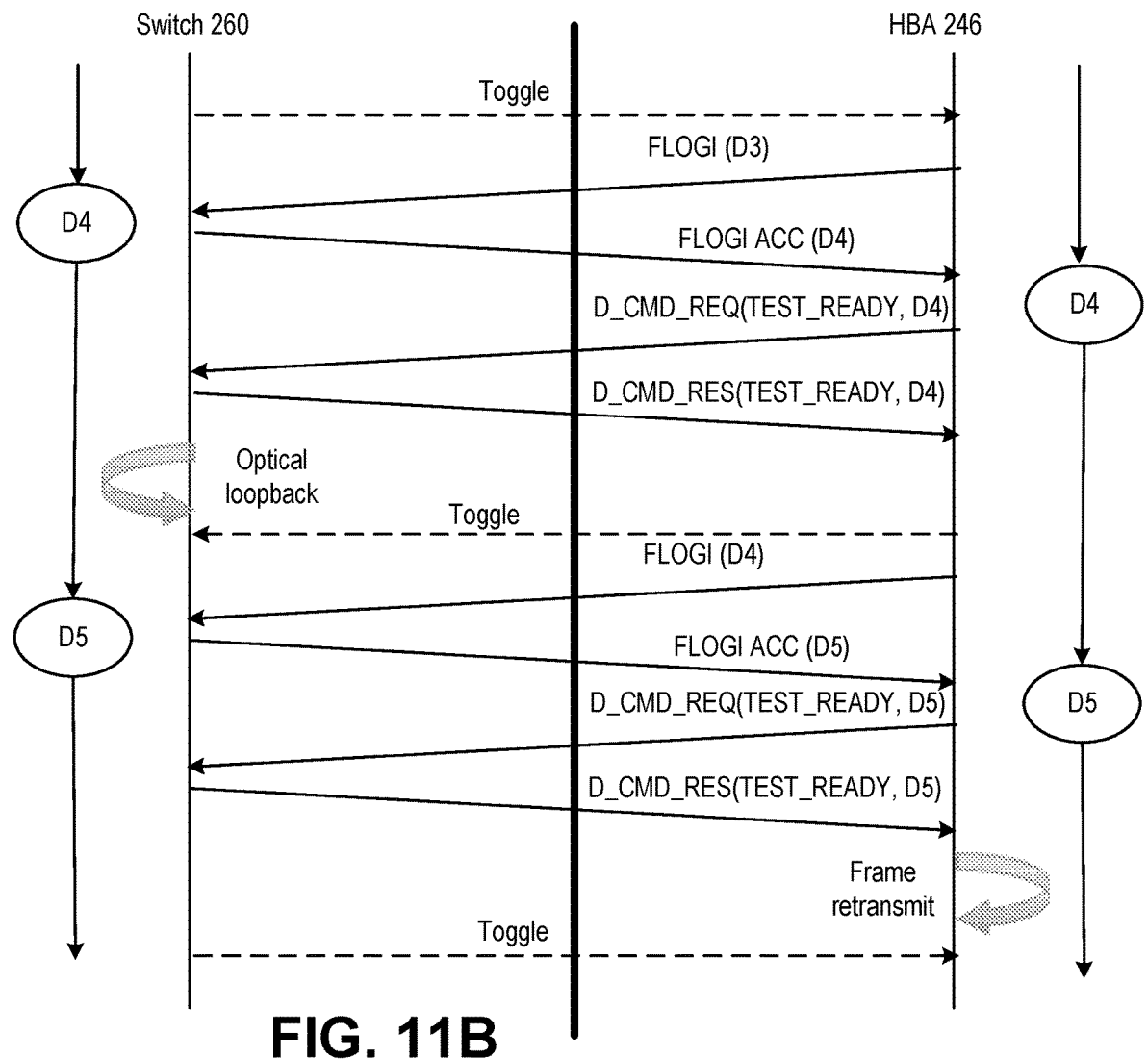
Figure 11C:
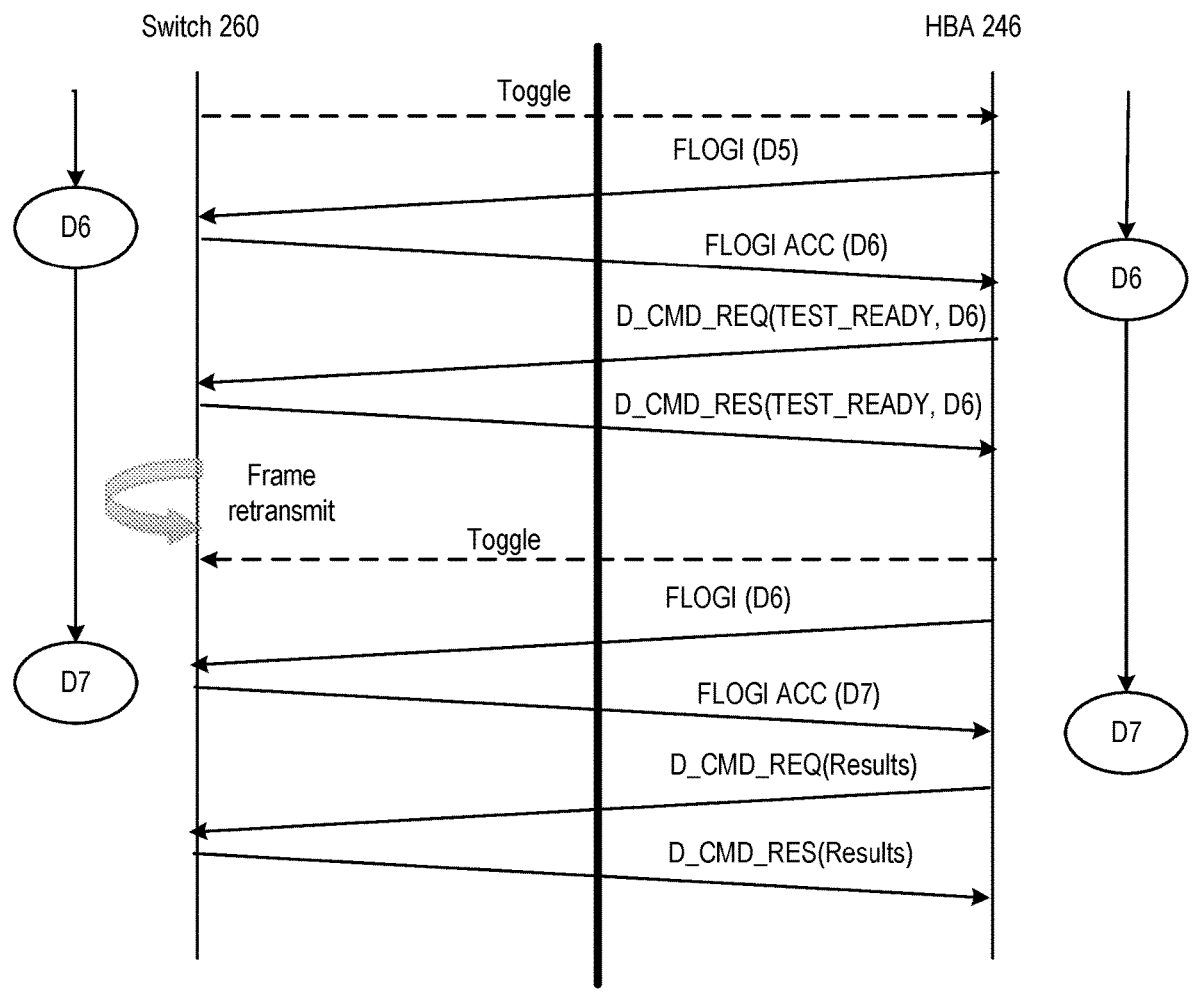
Figure 12:
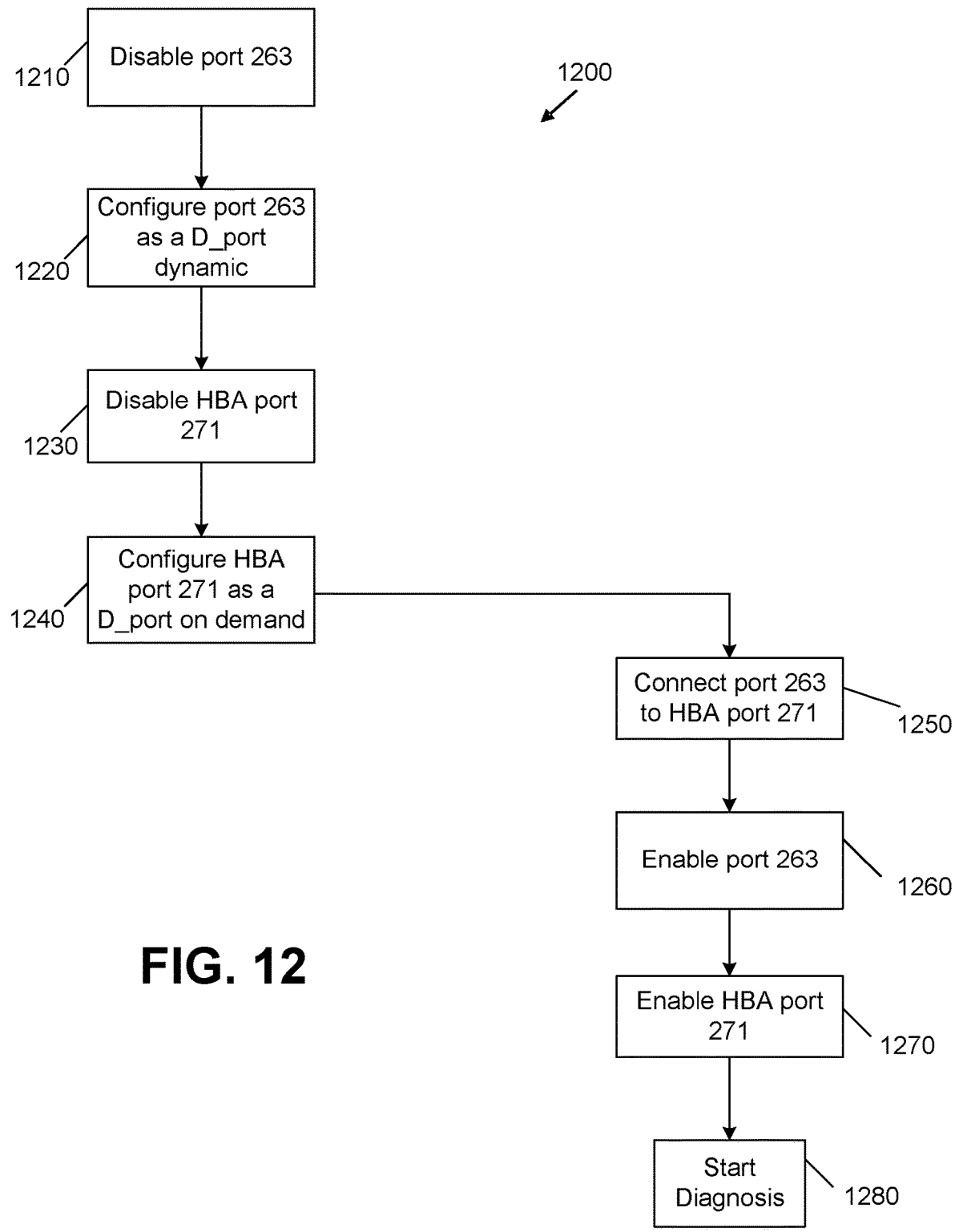
FIG. 12 is a flowchart illustrating a method for configuring a network port and an HBA port as D_Ports according to one embodiment for a node link.
Figure 13A:
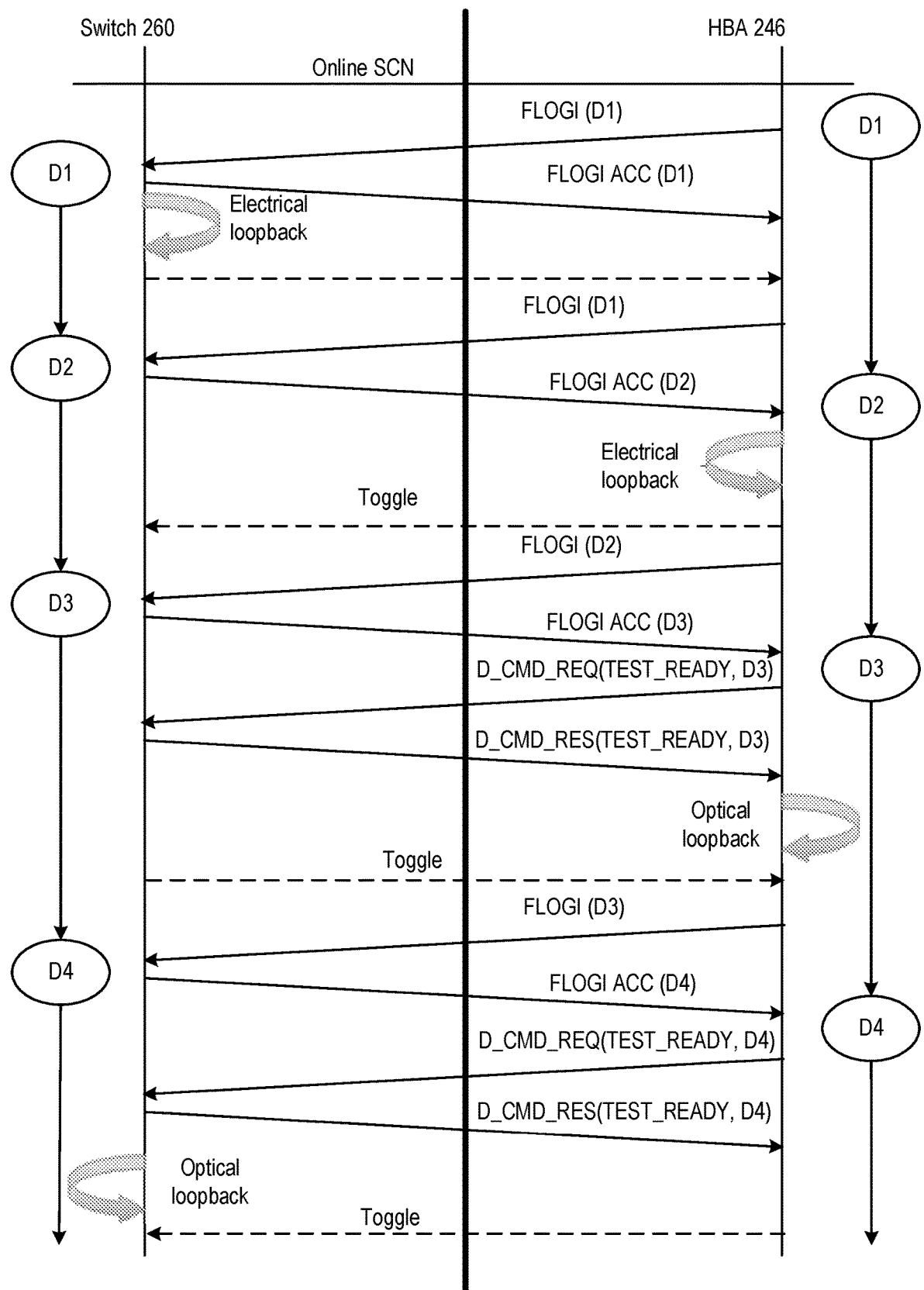
FIGS. 13A and 13B are a ladder diagram illustrating the states of the D_Ports as they will go through a D_Port diagnostic according to one embodiment for a node link.
Figure 13B:
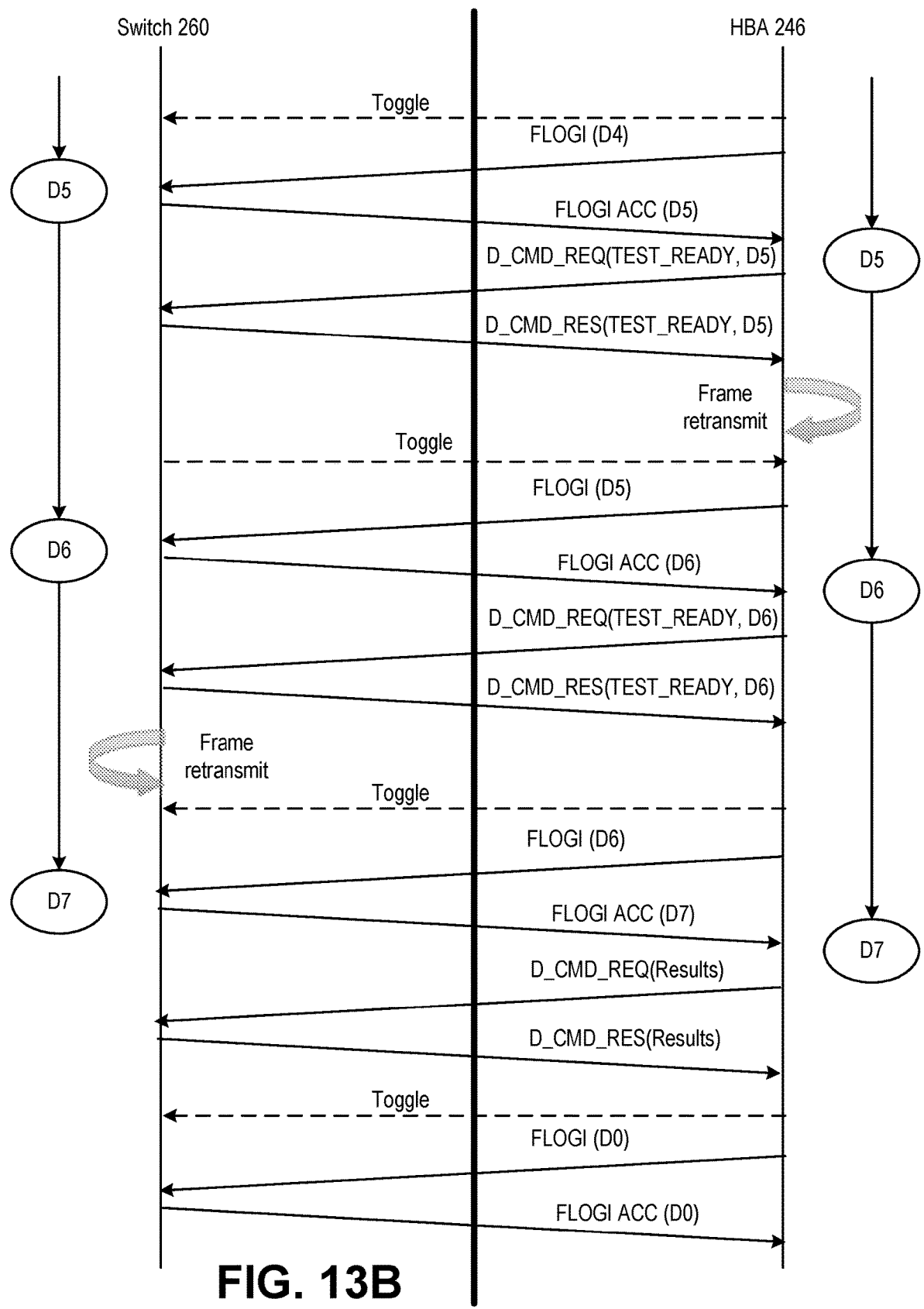

FIGS. 12, 13A and 13B indicate an embodiment where the switch port 263 is configured as a dynamic D_Port and the HBA port 271 is configured as an on demand port. In on demand mode the port behaves like a normal port but switches over to D_Port mode when an internal event, such as power on or an error, occurs. In this mode the switch port 263 operates normally until it receives an FLOGI D1, at which time it changes over to D_Port mode. The steps of FIG. 12 are similar to the steps of FIG. 10 except that in step 1220 the switch port 263 is configured as a dynamic D_Port and the HBA port is configured as an on demand port. FIGS. 13A and 13B are generally the same as FIGS. 11A and 11B, except that the HBA port 271 starts in state D1 by transmitting an FLOGI D1. The HBA port 271 enters this state because of a power-on test or an internal error.

Operation proceeds as in FIGS. 11A and 11B until states D7 are reached. After the switch port 263 sends its D_CMD_RES(Results), the HBA port 271 acknowledges by toggling. This toggling is an indication to both ports 263 and 271 to revert back to normal port operation, namely an F_Port and an N_Port. The HBA port 271 begins by sending an FLOGI D0 for a normal fabric login. The switch port 263 responds with an FLOGI ACC D0, a normal FLOGI ACC, and then operation continues as normal.

Other combinations are also possible. For example, both ports 263 and 271 can be configured as static D_Ports so normal D_Port operations begin upon connection, namely the switch port 263 commencing electrical loopback testing as discussed above. Alternatively, the HBA port 271 can be configured as a static D_Port and the switch port 263 can be a dynamic D_Port. The HBA port 271 will commence with an FLOGI D1, which the switch port 263 will respond with an FLOGI ACC D1 so that it can perform its electrical loopback testing. Then operation will proceed as above.

The roles of FIGS. 12, 13A and 13B can be reversed, so that operations begin when the switch 264 powers on rather than the HBA 246. The switch port 263 will begin doing the electrical loopback tests and either ignore or reject any FLOGI D0 frames received. Operation will proceed as in FIGS. 11A and 11B.

If both ports 263 and 271 are configured in dynamic mode, a user can initiate tests from the HBA as would have been possible for the embodiment of described in FIGS. 10, 11A, 11B and 11C, though in that specific example the HBA port 271 entered D_Port mode because the switch port 263 was in static D_Port mode. Both ports will start up normally. When a user command is received at the HBA 246, it will transition the HBA port 271 to D_Port mode and start the process, with an FLOGI D1 from the HBA port 271. The receipt of the FLOGI D1 will trigger the switch port 263 into D_Port mode and the full test will occur.

If both devices are configured in on demand mode, if either the switch 264 or the HBA 246 detect internal errors that indicate the need for a link test, then the switch 264 or the HBA 246 can itself commence D_Port operation. For example, if the HBA 246 determined the need, operation will proceed as in FIGS. 13A and 13B.

In other embodiments, dynamic and on demand modes can be combined, resulting in normal operation until either power on, an error or a user request.

It is understood that many of the above states can be skipped if the required capability is not present or there are errors that have occurred. The need to skip can be indicated in one embodiment by simply advancing the state value in the next FLOGI or FLOGI ACC frame to the next operation that can be performed or can be done in another embodiment by using a D_CMD_REQ(TEST_SKIP) command when a given test is requested or is to begin.

It is also understood that the disabling and enabling of the switch port and the HBA port as done in FIGS. 10 and 12 may not strictly be necessary for each diagnostic session when the ports are in the on demand or dynamic modes. Those modes can be stored so that upon power up of the switch or HBA the ports directly enter those modes without further specific user commands. A diagnostic session can be started at a later time on user command as discussed above, after the ports have been connected, active and communicating for some time, without specifically disabling and re-enabling the ports. FIGS. 10 and 12 are provided for contrast to FIGS. 4 and 8, where disabling is required as the ports must be taken offline to enter the static D_Port mode.

Therefore full testing of the switch and HBA link, a node link, can be done in the same manner as the ISL, though with slightly different commands due to the nature of the ports.

It is further noted that because switch ports can be configured as demand or as dynamic ports, should one of the switch ports be configured in on demand mode and one in dynamic mode, similar automatic on command or on reset diagnostic testing can occur when initiated from the on demand port. If both switch ports are set to dynamic mode, then on request testing can be done on ISLs as well from either end, with operation returning to normal ISL operations if there are no errors.

Accordingly, the D_Port diagnostic tests can be utilized to perform link level sanity tests in Fibre Channel networks. Such testing includes performing an electrical loopback test, an optical loopback test, and a link traffic test. To achieve this diagnostic testing, two ports at each end of a link are first identified and then statically configured by a user. The ports will be configured as D_Ports and as such will be completely isolated from the fabric with no data traffic flowing through them. The ports are then used to send test frames to perform the diagnostic tests. In this manner, the D_Port diagnostic tests improve testing capabilities for detecting single link faults.

Although described above generally in terms of FC fabrics and using FC terminology, the problems and techniques for graceful decommissioning of ports are not limited to FC fabrics and protocols, but may be implemented using similar techniques to those described above in Ethernet and other types of networks, including lossless networks using IEEE Data Center Bridging.

Figure 14:
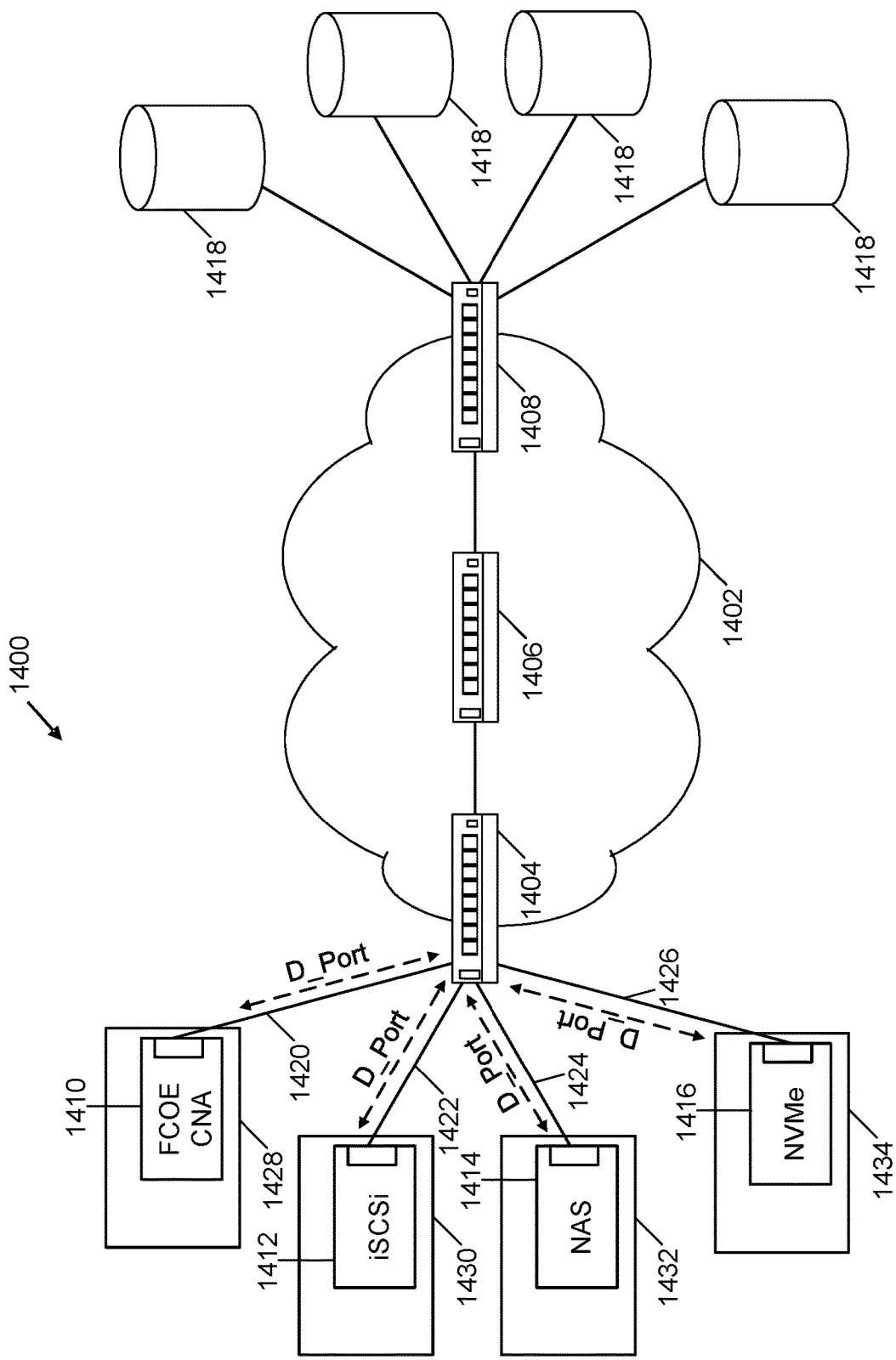
FIG. 14 is a diagram illustrating a network where embodiments of the present disclosure may also operate herewith.

FIG. 14 is a diagram illustrating a network 1400 where embodiments of the present disclosure may also operate herewith. As illustrated, network 1400 includes a fabric 1402 that provides storage, data networking, and network services for network 1400. Network 1400 is an Ethernet-based network where the fabric 1402 includes one or more general data networks (e.g., LANs). In one embodiment, fabric 1402 may be configured to support a variety of Ethernet and IP based protocols, such as Small Computer System Interface over IP (iSCSI), network attached storage (NAS), and FC over Ethernet (FCoE). The fabric 1402 includes switches 1404, 1406, and 1408 configured to transport data using one or more network protocols. Switches 1404, 1406, and 1408 may transport data from one or more hosts 1428, 1430, 1432, and 1434 to one or more storage devices 1418. As shown in FIG. 14, switch 1404 is coupled to the hosts 1428, 1430, 1432, and 1434 via adapters 1410, 1412, 1414, and 1416, respectively, and switch 1408 is coupled to the storage devices 1418. Switches 1404, 1406, and 1408 are interconnected with each other and/or with other switches (not shown in FIG. 14) within the fabric 1402 via links, such as Ethernet links.

FIG. 14 illustrates that switch 1404 is connected to various adapters 1410, 1412, 1414, and 1416 via node links 1420, 1422, 1424, and 1426, respectively. Each of the adapters 1410, 1412, 1414, and 1416 in FIG. 14 communicate with switch 1404 using Ethernet-based protocols. Adapters 1410, 1412, 1414, and 1416 act as network interfaces for hosts 1428 to connect to the fabric 1402. The adapters 1410, 1412, 1414, and 1416 may be the same type of adapters (e.g., a network interface controller (NIC)) or can be different adapter types (e.g., converged network adapter (CNA) and NIC). FIG. 14 also illustrates that for each of the node links 1420, 1422, 1424, and 1426, ports associated with the node links 1420, 1422, 1424, and 1426 can be configured as D_Ports to perform diagnostic testing.

In one embodiment, to configure the ports for the different node links 1420, 1422, 1424, and 1426, rather than configuring the ports to D_Ports using a FC protocol, the ports can be configured as D_Ports using a Link Level Discovery Protocol (LLDP). Generally, LLDP is compatible with a variety of Ethernet-based networks and can include a number of extensions to accommodate variety of network requirements, such as Data Center Bridging requirements. Specifically, LLDP is flexible in terms of carrying organization specific information in the type-length-values (TLVs) where an LLDP advertisement frame can include one or more optional TLVs. By adding organization specific TLVs to exchange information between ports, the ports can be configured as D_Ports that perform diagnostic testing.

As discussed above, to implement diagnostic testing using D_Ports, the ports at each end of a node link 1420, 1422, 1424, and 1426 negotiate D_Port capabilities and when to start and stop loopback testing. The ports can transition through a D_Port state diagram shown in FIG. 19 to perform different diagnostic tests. In contrast to the state diagram shown in FIG. 7, rather than utilizing the FC protocol to exchange FLOGI frames and toggle ports, the ports at each end of a node link 1420, 1422, 1424, and 1426 exchange LLDP advertisement frames sent at specific advertisement time intervals. In one embodiment, the ports are able to move through different states by exchanging LLDP advertisement frames at the advertisement time intervals. By moving through the different states, the ports are able to perform a variety of link diagnostic tests that include electric loopback test, optical loopback test, and link traffic test. Having the ports transition to different states based on advertisement frames and advertisement time intervals are discussed in more detail in FIGS. 19 and 20A-20C.

Figure 15:
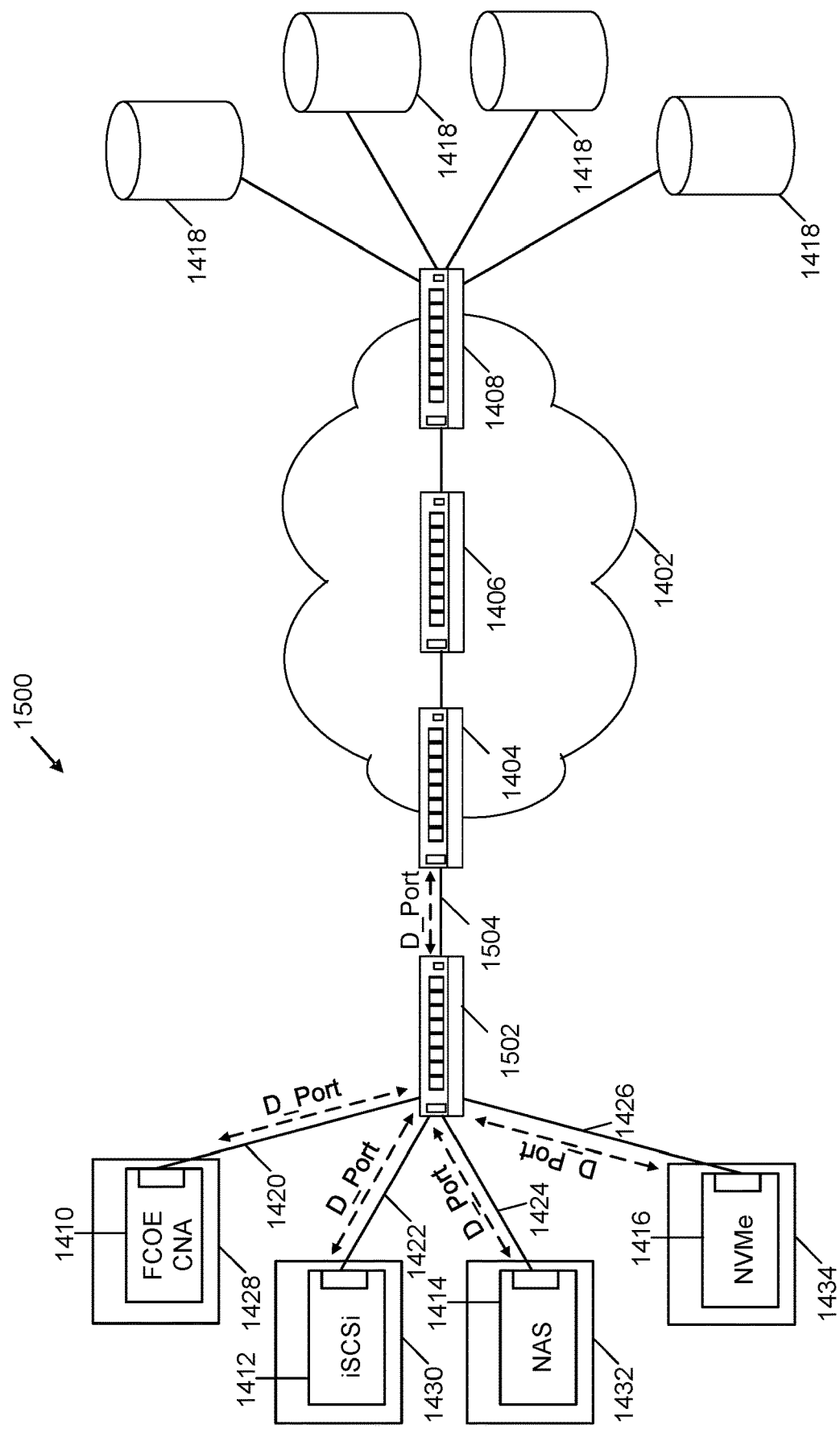
FIG. 15 is a diagram illustrating another network where embodiments of the present disclosure may operate herewith.

FIG. 15 is a diagram illustrating another network 1500 where embodiments of the present disclosure may operate herewith. Network 1500 is similar to network 1400 except that switch 1404 is connected to a top of rack (ToR) switch 1502. In FIG. 15, the hosts 1428, 1430, 1432, and 1434 are coupled to the fabric 1402 using the ToR switch 1502. The ToR switch 1502 may connect to adapters 1410, 1412, 1414, and 1416 using node links 1420, 1422, 1424, and 1426 and connect to switch 1404 via link 1504 (e.g., Ethernet link). Similar to FIG. 14, diagnostic testing using D_Ports can again occur at node links 1420, 1422, 1424, and 1426 and also link 1504 using LLDP.

Figure 16:
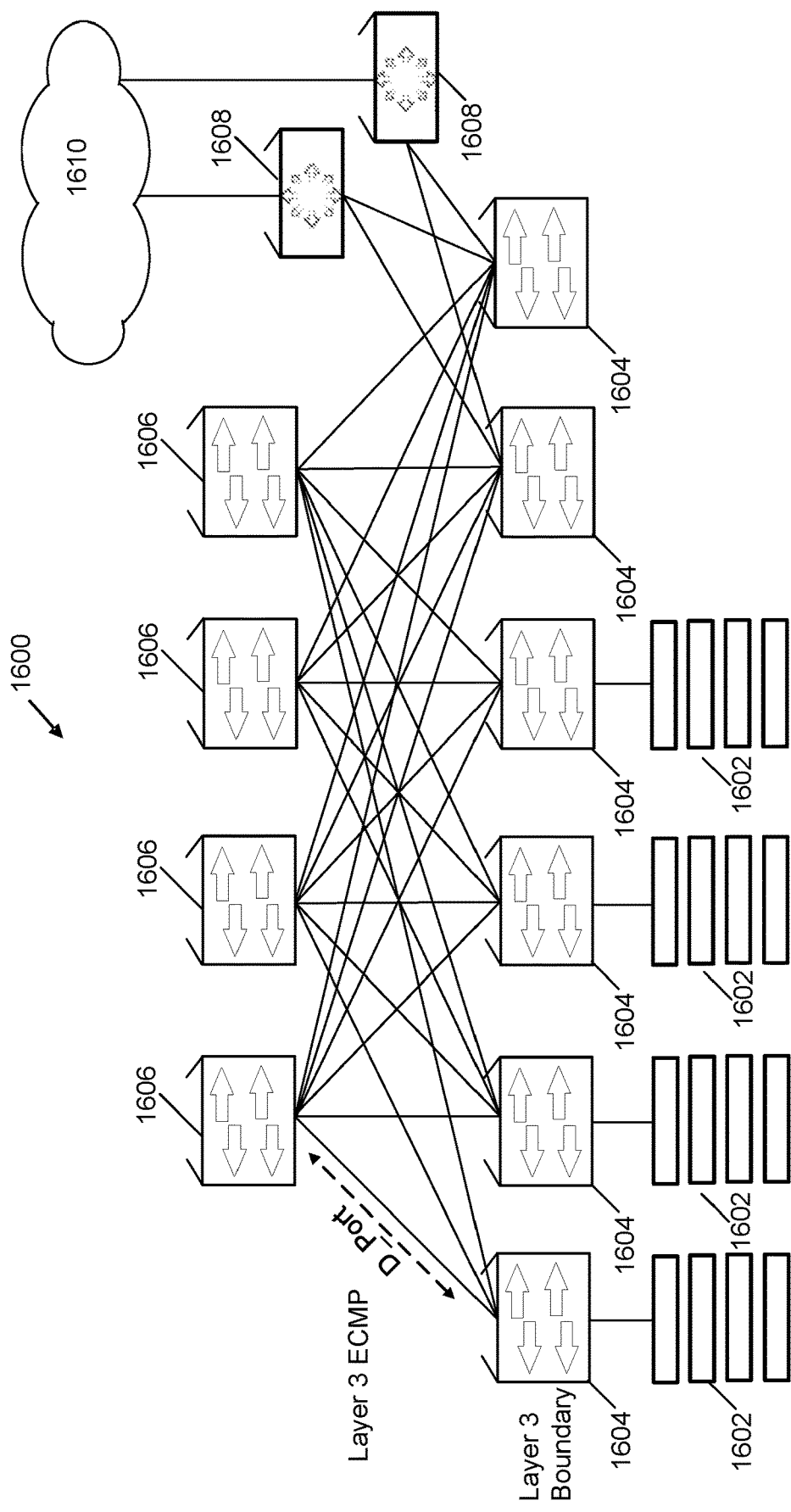
FIG. 16 is a diagram illustrating another network where embodiments of the present disclosure may operate herewith.

FIG. 16 is a diagram illustrating a network 1600 where embodiments of the present disclosure may operate herewith. Network 1600 is an IP fabric deployed in a three-stage Clos network. As an IP fabric, network 1600 may be optimized for Layer 3 deployment and includes a plurality of servers 1602, a plurality of leaf switches 1604, a plurality of spine switches 1606, a plurality of core switches 1608, and a network 1610. The leaf switches 1604, spine switches 1606, and core switches 1608 may be coupled to each other based on Equal Cost Multi-Path (ECMP) routing. Based on the ECMP routing, the leaf switches 1604 and spine switches 1606 are connected to each other via links 1612. Ports at the end of links 1612 may be configured as D_Ports to perform diagnostic testing using LLDP.

Although FIGS. 14-16 illustrate specific embodiments of an Ethernet-based network that utilizes LLDP to perform D_Port diagnostic testing, the disclosure is not limited to the specific embodiments illustrated in FIGS. 14-16. For example, FIG. 14 illustrates a network 1400 that has adapters 1410, 1412, 1414, and 1416 connected to a single switch 1404. Other embodiments may have one or more of the adapters 1410, 1412, 1414, and 1416 connected to other switches. Additionally, the Ethernet-based fabrics illustrated in FIGS. 14 and 15 are not limited on the types of network protocols that may be layered on top of the fabric (e.g., Open Systems Interconnection (OSI) layer 3). The use and discussion of FIGS. 14-16 are only examples to facilitate ease of description and explanation.

Figure 17:
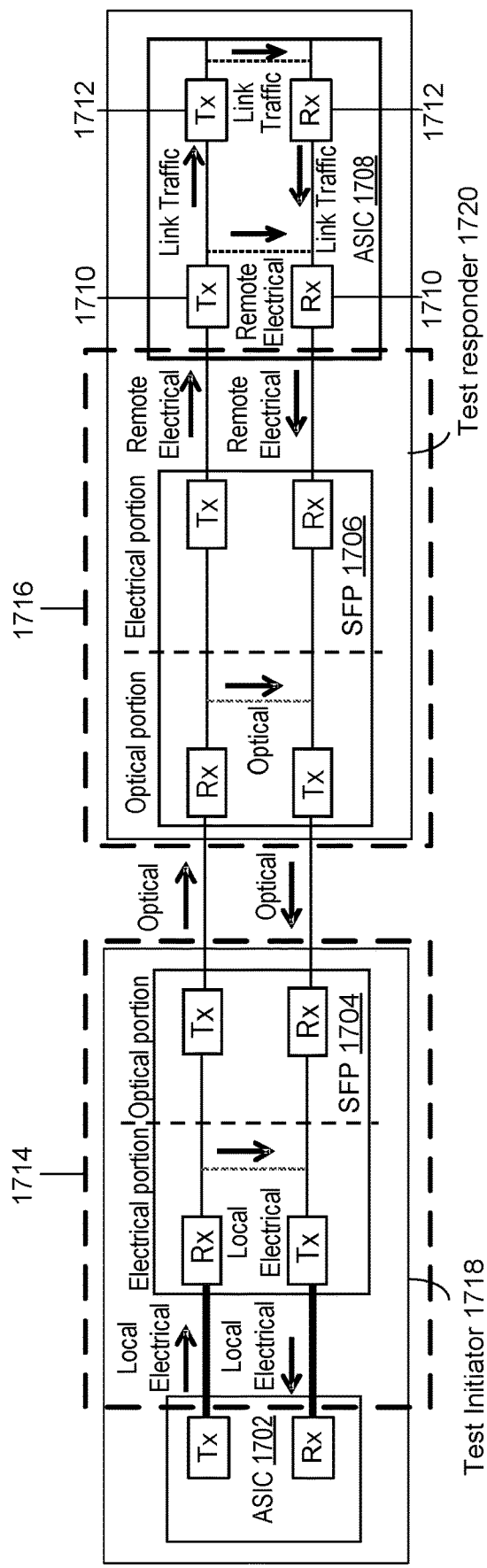
FIG. 17 is a block diagram illustrating the performance of D_Port diagnostic testing on links according to one embodiment.

FIG. 17 is a block diagram illustrating the performance of D_Port diagnostic testing on links according to one embodiment. As shown in FIG. 17, a test initiator 1718 initiates the diagnostic tests, while at the other end of the link, a test responder 1720, responds. In FIG. 17, a local electrical loopback test occurs locally at the test initiator 1718. In a local electrical loopback test, electrical signals are transmitted between the local ASIC 1702 and local SFP 1704. The local SFP 1704 loopbacks electrical signals received from the local ASIC 1702. In one embodiment, although not shown in FIG. 17, the test responder 1720 could also simultaneously perform a local electrical loopback test between the remote ASIC 1708 and remote SFP 1706 while the test initiator 1718 performs its local electrical loopback test. While FIG. 17 illustrates that test initiator 1718 and test responder 1720 include ASIC devices (e.g., local ASIC 1702), other embodiments of the test initiator 1718 and test responder 1720 could include other types of network frame handling elements that manage and perform forwarding operations.

In contrast to the local electrical loopback test, the optical loopback test, the remote electrical loopback test, and the link traffic test are not performed locally. Instead the remote port receives test frames from the test initiator 1718 and retransmits (e.g., loopbacks) the test frames back to the test initiator 1718. In an optical loopback test, tests frames in the electrical domain are sent from the local ASIC 1702 to the local SFP 1704. At the local SFP 1704, the test frames are converted to the optical domain and are sent to the remote SFP 1706 as optical signals. The remote SFP 1706 then performs an optical loopback that loopbacks the optical test signals to the local SFP 1704. The looped back optical signals are then converted back to the electrical domain at the local SFP 1704 and forwarded to the local ASIC 1702 to check for any errors.

The remote electrical loopback test and the link traffic test also loopbacks test frames similar to the optical loopback test except the loopback occurs at the remote ASIC 1708. For the remote electrical loopback test, the loopback occurs at the TX/RX component 1710, which correspond to the ports for the remote ASIC 1708. In FIG. 17, the link traffic test frames traverse through both the TX/RX component 1710 and the TX/RX component 1712. The TX/RX component 1712 corresponds to the basic switching functions of the switch. For retransmission back to the test initiator 1718, the link traffic test then has the test frames exit out of the TX/RX component 1710. To perform loopback at the basic switching functions of the switch, the link traffic test utilizes test frames that have the same destination and source port address. Recall that for the link traffic test, the test initiator 1710 injects and transmits to the test responder 1720 a sizeable amount of test frames (e.g., millions), which the test responder 1720 loopbacks to the test initiator 1718 to check for any errors.

FIG. 17 also illustrates an embodiment of the hardware portion of the network ports 1714 and 1716. In FIG. 17, the hardware portion of network port 1714 includes portions of ASIC 1702 and SFP 1704, and the hardware portions of network port 1716 includes portions of ASIC 1708 and SFP 1706. Configuring the network ports 1714 and 1716 to perform loopback testing and to transition to different loopback states may be implemented with one or more processors and/or memory devices, such as processor within the processor and I/O interface complex 202 and flash memory 210 shown in FIG. 3A. As an example, a test initiator 718 (e.g., a switch) includes flash memory that contains a program that controls and manages operations related to D_port diagnostic testing at the network port 1714 as described in FIGS. 19 and 20A-C. Using FIG. 17 as an example, the program controls operations for the network port 1714 to perform loopback of received test frames, clear loopback testing at the network port 1714, provide frames to be looped back by network port 1716, provide the messaging between the network ports 1714 and 176, and when the network port 1714 performs each loopback test.

Figure 18:
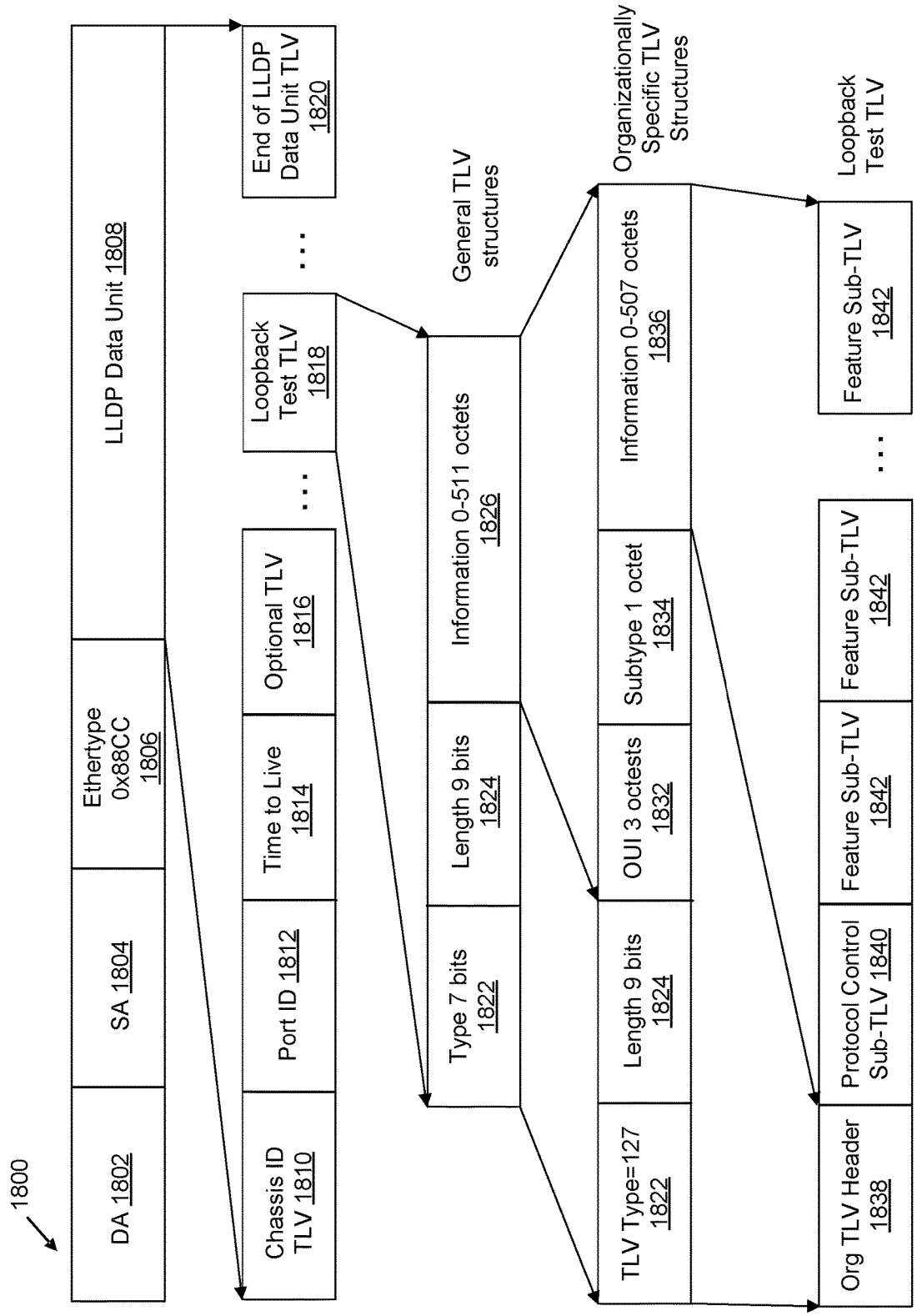
FIG. 18 illustrates an embodiment of an advertisement frame utilized for D_Port diagnostics based on Link Level Discovery Protocol (LLDP).

FIG. 18 illustrates an embodiment of an advertisement frame 1800 utilized for D_Port diagnostics based on LLDP. To perform D_Port diagnostics, two ports transition to a variety of coordinated states. The two ports can also be generally referred throughout at this disclosure as end points for a connection between two peer devices. LLDP implements D_Port diagnostic operations between the two ports, such as learning capabilities of peer devices, negotiating responsibilities between peer devices, starting diagnostic testing, and stopping diagnostic testing. To progress through the different D_Port diagnostics state, LLDP advertisement frames 1800 are sent between the two ports. The LLDP advertisement frames 1800 includes organizational specific TLVs that can be used to exchange information relating to D_Port diagnostics between the two peer devices.

Using FIG. 18 as an example, the advertisement frame 1800 is an Ethernet Frame that includes a destination address field 1802, a source address field 1804, an Ethertype field 1806, and a LLDP data unit 1808. The destination address field 1802 includes a destination MAC address and the source address field 1804 includes a source MAC address. In FIG. 18, the Ethertype field 1806 is set to 0x88CC to indicate the utilization of LLDP and that a LLDP data unit is encapsulated as the payload of the advertisement frame 1800. The LLDP data unit 1808 includes a plurality of TLV structures. For example, the LLDP data unit 1808 includes mandatory TLV types, such as chassis identifier (ID) TLV 1810, port ID 1812, Time to Live TLV 1814, and end of LLDP data unit TLV 1820, and optional TLV types 1816.

FIG. 18 illustrates that one of the optional TLVs, Loopback Test TLV 1818, is designated for exchanging information to perform D_Port diagnostics. The Loopback Test TLV 1818 can include a type field 1822, a length field 1824, and an information field 1826. The type field 1822 is 7 bits long and has a value of 127 and the length field 1824 is 9 bits long. The information field 1826 includes an organizational unique identifier (OUI) field 1832 and a subtype field 1834 and an information field 1836. In FIG. 18, the type field 1822, length field 1824, organizational unique identifier (OUI) field 1832, and the subtype field 1834 form the organizational header 1838 and the information field 1836 can be broken down into the control sub-TLV field 1840 and a plurality of feature sub-TLVs 1842. The control sub-TLV field 1840 and feature sub-TLVs 1842 may include information to implement the D_Port diagnostics.

Figure 19:
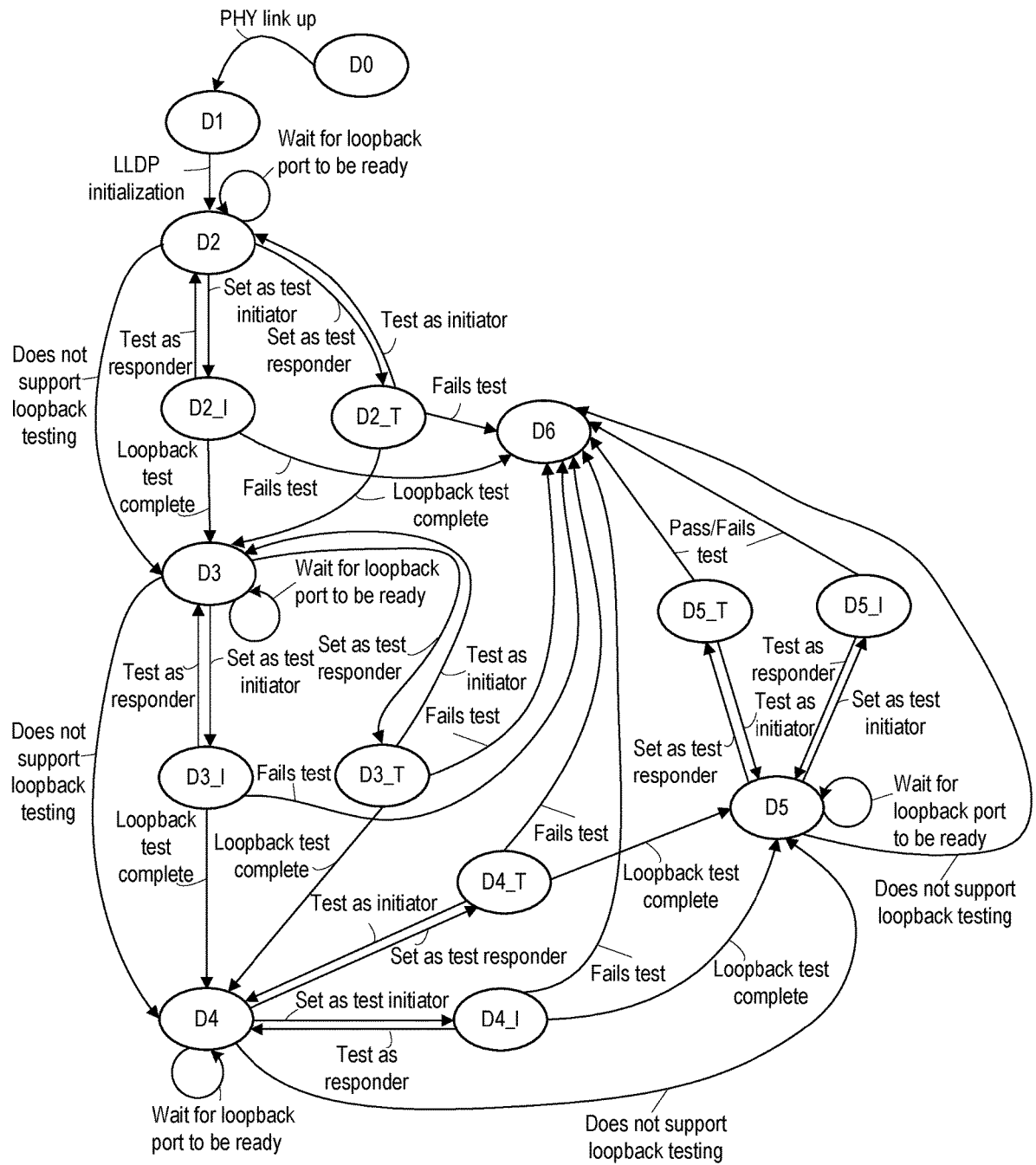
FIG. 19 illustrates a state diagram that depicts the different states of a port when performing D_Port diagnostics using LLDP.

FIG. 19 illustrates a state diagram 1900 that depict the different states of a port when performing D_Port diagnostics using LLDP. For example, the state diagram 1900 may correspond to state changes for a local port of a local peer device (e.g., network interface) when implementing different loopback tests with a remote port of a remote peer device (e.g., a switch). In one embodiment, by utilizing LLDP, the state diagram 1900 is able to transition to different states triggered through LLDP advertisement frames at designated advertisement time intervals. The LLDP advertisement frames are sent according to an advertisement time interval set during a negotiation operation between the local peer device and the remote peer device. In one embodiment, the advertisement time interval may be negotiated and set based on the following time parameters: (1) the time to perform a specific loopback test (e.g., optical loop test), (2) the operation time that is greater than the testing time used to configure both the buffers of the test initiator and test responder device, and (3) the skew of the link that connects the local port with the remote port. In instances where the loopback testing is completed and loopback is removed before the start of the next advertisement time interval, the state diagram 1900 can continue operating. In other instances where the loopback testing fails to complete by the start of the next advertisement time interval, the state diagram 1900 stops operations. Other embodiments of the state diagram 1900 could perform toggling operations similar to toggling operations shown in FIGS. 13A and 13B to indicate a port has completed loopback testing.

As illustrated in FIG. 19, the local port starts at a D0 state, which corresponds to a physical link up event for the local port. The physical link up event relates to a physical link-layer connection that connects the local port and remote port together. At the D0 state, the local peer device and remote peer device detect whether a network connection exists between the local port and the remote port. In other words, the physical link up event indicates whether the local port is capable of transferring data to and from the remote port. Once the physical link up event completes, the local port moves to a D1 state to perform an LLDP initialization to enable the port to communicate with the remote port using LLDP. From the D1 state, the local port transitions to the D2 state.

At the D2 state, the local port exchanges capabilities for performing a local electrical loopback test. In particular, the local peer device and the remote peer device exchange advertisement frames to learn each other's capability to perform local electrical loopback testing and to negotiate the advertisement time interval when performing the local electrical loopback testing. One or both the peer devices start a timer or perform some other time monitoring operation to track the advertisement time interval to determine when to send out other advertisement frames, start/stop loopback testing and/or to transition to the next state. For instance, an advertisement time interval may be set to about 90 seconds, where once the timer reaches the 90 seconds mark, the peer device transmits an advertisement frame that stop loopback testing or transitions the next state of the state diagram 1900. The advertisement time intervals can range from about 4-180 seconds and may initially be set to a default value of 30 seconds. Additionally, at the D2 state, the local peer device and the remote peer device determine which peer device acts as the test initiator and test responder.

From the D2 state, the local port transitions to three different states, D2_I, D2_T, and D3 or wait in the D2 state. A local port can transition to the D2_I state when the local peer device is set to the test initiator and the remote peer device is set to the test responder during the negotiation operation and the local port SFP supports and is ready to perform local electrical loopback testing. The local peer device can initially be set as the test initiator, after a determination the remote port SFP does not support local electrical loopback, or after completing loopback testing as the remote port. The local port transitions to the D2_T when the local peer device is set to the test responder and the remote port SFP supports and is ready to perform local electrical loopback testing. A local peer device can initially be set as the test responder, after a determination that the local port SFP does not support local electrical loopback testing, or after completing loopback testing at the local port. In instances where both the local port SFP and the remote port SFP do not support local electrical loopback testing, the local port transitions from the D2 state to the D3 state. The local port remains in the D2 state where the local peer device is set to the test initiator and the local port SFP is able to support local electrical loopback testing but is not ready to perform the loopback testing. The local port could also remain in the D2 state where the local peer device is set to the test responder and the remote port SFP is able to support local electrical loopback testing but is not ready to perform the loopback testing.

At the D2_I state, the local peer device performs local electrical loopback testing with the local port SFP at the local port. Recall that the local peer device starts a timer at the D2 state. Based on the timer value, the local peer device may send out one or more notifications that indicate that the local electrical loopback testing has stopped and that the loopback has cleared at the local port. In one embodiment, the notification is sent when an advertisement time interval elapses, for example, the timer has reached the time limit. In another embodiment, the notification is sent before the advertisement time interval elapses, but according to when a predetermined amount of time lapses, for example, when half of the advertisement time interval elapses. Once the local electrical loopback testing successfully completes, the local port transitions back to the D2 state when the local peer device has not previously performed the local electrical loopback as the test responder. Conversely, if the local peer device has previously performed the local electrical loopback as the test responder, the local port transitions to the D3 state. If the local port fails to complete the local electrical loopback within the advertisement time interval or a predetermined time interval, rather than transitioning to the D2 state or D3 state, the local port transitions to the D6 state.

The local port transitions from the D2 state to the D2_T state when the local peer device is set to the test responder during the negotiation operation and the remote port SFP supports and is ready to perform remote electrical loopback testing. At the D2_T state, the remote port SFP performs local electrical loopback testing at the remote port. Based on the timer value at the remote peer device, the local peer device receives a notification that indicates that the local electrical loopback testing has stopped and that the loopback has cleared at the remote port. The remote peer device can send the notification when an advertisement time interval elapses, for example, the timer at the remote peer has reached the time limit or some other predetermined time interval that is based on the advertisement time interval elapses. Once the remote port successfully completes local electrical loopback testing within an advertisement time interval, the local port transitions back to the D2 state when the local peer device has not previously performed the local electrical loopback as the test initiator. Alternatively, the local port transitions to the D3 state for situations where the local peer device has previously performed local electrical loopback testing as the test initiator. If the remote port fails to complete local electrical loopback testing within the advertisement time interval or predetermined time interval, then the local port transitions to the D6 state.

The D3 state corresponds to the optical loopback test portion of the D_Port diagnosis using LLDP. As part of the D3 state, the peer devices exchange capabilities relating to the optical loopback test. Also, analogous to the D2 state, the local peer device and the remote peer device can negotiate the advertisement time intervals for loopback testing and which peer devices act as the test initiator and test responder for the optical loopback testing. For the D3 state, one or both the peer devices may also utilize a timer or some other time operation to determine when to send out the next advertisement frames, start/stop loopback testing, and/or transition to the next state. In one embodiment, the negotiated advertisement time interval for the D3 state is the same for the D2 state. In other embodiments, the negotiated advertisement time interval for the D3 state could be different than the D2 state.

From the D3 state, the local port also transitions to three different states, D3_I, D3_T, and D4. The local port can transition to the D3_I state when the local peer device is set to the test initiator and the remote port SFP supports and is ready to loopback optical signals. The local port can be initially set to the test initiator, after determining that the remote port SFP does not support optical loopback, or after completing optical loopback as the remote port. FIG. 19 also illustrates that the local port is able to transition from the D3 state to the D3_T state. To transition the D3_T state, the local peer device is set to the test responder and the local port SFP supports and is ready to loopback optical signals. Setting the local peer device to the test responder can occur after determining the remote port SFP does not support looping back optical signals and the local peer device did not previously perform optical loopback testing as the test responder, or the local peer is initially set to the test responder during the negotiation operation. In instances where both the local port SFP and the remote port SFP do not support optical loopback testing, the local port transitions from the D3 state transitions to the D4 state. Similar to the D2 state, the local port remains in the D3 state when the designated loopback port is capable of performing loopback, but is not ready to perform loopback testing.

At the D3_I state, the local port transmits optical signals to the remote port, which then receives the optical signals and loopbacks the optical signal to the local port. As discussed in FIG. 17, the local port SFP converts the looped back optical signals to the electrical domain to detect for errors. Once the D3_I state successfully completes optical loopback testing, the remote peer device sends a notification to the local peer device that the remote peer device has cleared the optical loopback for the remote port. In one embodiment, the remote peer device starts a timer and based on the timer value determining whether an advertisement time interval elapses. Alternatively, the notification can be sent before the advertisement time interval elapses, but according to when a predetermined amount of time that is based on the advertisement time interval lapses (e.g., half of the advertisement time interval). Once the optical loopback testing successfully completes, the local port transitions back to the D3 state when the local peer device has not previously performed the optical loopback testing as the test responder. Conversely, if the local peer device has previously performed the optical loopback testing as the test responder, the local port transitions to the D4 state based on a determination that optical loopback testing is complete. If the remote port fails to complete optical loopback testing within the advertisement time interval or predetermined time interval, the local port transitions to the D6 state.

For the D3_T state, the local peer device is set to the test responder and the remote peer device is set to the test initiator based on the negotiation operation. After determining that the local port SFP is ready to perform optical loopback testing, the local port SFP performs optical loopback testing at the local port by setting the local port SFP to loopback the optical signals. Based on the timer value at the local peer device, the local peer device may transmit a notification to indicate that the optical loopback testing has stopped and the loopback has cleared at the local port. Similar to the D3_I state, the notification can be sent when an advertisement time interval elapses or when a predetermined time interval lapses. Once the local port successfully completes optical loopback testing within an advertisement time interval, the local port transitions back to the D3 state when the local peer device has not previously performed the optical loopback testing as the test initiator. Alternatively, the local port then transitions to the D4 state for situations where the local peer device has completed optical loopback testing as both the test initiator and test responder. If the local port fails to complete optical loopback testing within the advertisement time interval or predetermined time interval, the local port transitions to the D6 state.

The D4 state involves performing a remote electrical loop back using the local port and remote port. Similar to the D3 state, the peer devices exchange advertisement frames to learn each other's capability, negotiate the advertisement time intervals, and which peer device acts as the test initiator and test responder. One or both the peer devices start a timer to determine when to send out the next advertisement frames, start/stop loopback testing and/or transition to the next state. In one embodiment, the determined advertisement time intervals have the same values as the advertisement time intervals negotiated in the D2 and/or D3 state. Other embodiments may have different determined advertisement time intervals than the advertisement time intervals negotiated in the D2 and/or D3 state.

From the D4 state, the local peer device is able to transition to three different states, D4_I, D4_T, and D5 in a similar manner to transitioning to D3_I, D3_T, and D4, respectively, from the D3 state. Rather than determining whether the local and/or the remote peer device are able to support the optical loopback, the peer devices at the D4 state determine whether they support remote electrical loopback testing. The local port can transition to the D4_I state based on similar conditions described for transitioning to the D3_I state. For example, the local port can transition to the D4_I state when the local peer device is initially set to the test initiator and the remote peer device and is ready to loopback electrical signals sent from the local peer device. The local port can transition to the D4_T based on similar conditions described for transitions to the D3_T state. As an example, the local port can transition to the D4_T state when the local peer is initially set to the test responder and the local peer device supports and is ready to loopback electrical signals sent from the remote peer device.

At the D4_I state, the remote peer device performs remote electrical loopback testing as shown in FIG. 17. Once the D4_I state successfully completes remote electrical loopback testing, the remote peer device sends a notification to the local peer device that the remote peer device has cleared the remote electrical loopback for the remote port. Similar to the D3_I state, the remote peer device can start a timer and based on the timer value to determine whether an advertisement time interval and/or a predetermined amount of time lapses. Once the remote electrical loopback testing successfully completes, the local port transitions back to the D4 state when the local peer device has not previously performed remote electrical loopback testing as the test responder. If the local peer device has previously performed remote electrical loopback testing as the test responder, and thus completed remote electrical loopback testing, the local port transitions to the D5 state. If the local port fails to complete remote electrical loopback testing within the advertisement time interval or predetermined time interval, the local port transitions to the D6 state.

For the D4_T state, the local peer device is set to the test responder and the remote peer device is set to the test initiator based on the negotiation operation. After determining that the local peer device is ready to perform remote electrical loopback testing, the local peer performs remote electrical loopback testing by setting the ASIC to perform electrical loopback at the local port. Clearing the remote electrical loopback testing can be implemented in a similar manner as described for the D3_T state using an advertisement time interval and/or predetermined time interval. Once the local port successfully completes remote electrical loopback testing within an advertisement time interval, the local port transitions back to the D4 state if the local peer device has not previously performed the remote electrical loopback testing as the test initiator. Alternatively, the local port then transitions to the D5 state for situations where the local peer device has previously performed remote electrical loopback testing as the test initiator. If the local port fails to complete remote electrical loopback testing within the advertisement time interval or predetermined time interval, then the local port transitions to the D6 state.

The D5 state corresponds to performing link traffic testing. As discussed for the D3 and D4 state, the peer devices exchange advertisement frames to learn each other's capability, negotiate the advertisement time intervals, and which peer device acts as the test initiator and test responder. The peer devices may also start a timer to determine when to send out the next advertisement frames and/or transition to the next state. In one embodiment, the determined advertisement time intervals have the same values as the advertisement time intervals negotiated in the D2, D3, and/or D4 state. Other embodiments may have different determined advertisement time intervals than the advertisement time intervals negotiated in the D2, D3, and/or D4 state.

From the D5 state, the local peer device is able to transition to three different states, D5_I, D5_T, and D6 in a similar manner as transitioning to D3_I, D3_T, and D4, respectively, from the D3 state. Rather than determining whether the local and/or the remote peer device are able to support the optical loopback when in the D3 state, the peer devices at the D5 state determine whether they support link traffic testing. The local port can transition to the D5_I state based on similar conditions described for transitioning to the D3_I state. The local port can transition to the D5_T based on similar conditions described for transitions to the D3_T state.

When the remote peer device is ready to perform link traffic testing, the local port then transitions from the D5 state to the D5_I state. At the D5_I state, the local port transmits frames to the remote peer device, which subsequently retransmits the frames to the local port via the remote port. Once the D5_I state successfully completes the link traffic testing, the remote peer device sends a notification to the local peer device indicating the routes for the retransmission of frame have been cleared for the remote port. Similar to the D3_I state, the remote peer device starts a timer and based on the timer value determines whether an advertisement time interval and/or a predetermined amount of time lapses. Once the link traffic testing successfully completes, the local port transitions back to the D5 state when the local peer device has not previously performed the link traffic testing as the test responder. If the local peer device has previously performed the optical loopback testing as the test responder, the local port transitions to the D6 state indicating the completion and passing all of the loopback tests. If the local port fails to complete link traffic testing within the advertisement time interval or predetermined time interval, the local port also transitions to the D6 state indicating a failure under link traffic testing.

For the D5_T state, the local peer device is set to the test responder and the remote peer device is set to the test initiator based on the negotiation operation. After determining that the local peer device is ready to perform link traffic testing, the local peer performs remote electrical loopback testing. Clearing the remote electrical loopback testing can be implemented in a similar manner as described for the D3_T state using advertisement time intervals and/or predetermined time interval. Once the local port successfully completes link traffic testing within an advertisement time interval, the local port transitions back to the D4 state if the local peer device has not previously performed link traffic testing as the test initiator. The local port transitions to the D6 state for situations where the local peer device has previously performed link traffic testing as the test initiator. If the local port fails to complete remote electrical loopback testing within the advertisement time interval or predetermined time interval, then the local port transitions to the D6 state.

The D6 state is the final state after the tests are completed. There will be a completion code associated with this state. The completion code will be SUCCESS if all the applicable tests completed successfully; otherwise it will contain the failure code, which will be passed to the CLI and will also be displayed as such.

FIGS. 20A-20C are ladder diagrams illustrating the states of the D_Ports as they progress through a D_Port diagnostic according to one embodiment for a node link. As shown in FIGS. 20A-20C, advertisement frames are sent between a first peer device 2006 and a second peer device 2008 based on negotiated advertisement time intervals. In FIGS. 20A-20C, the negotiated advertisement time interval is labeled as "LLDP TxInterval," where advertisement frames are transmitted at the halfway point of the LLDP TxInterval. For example, the LLDP TxInterval could be set at 180 seconds when the time to complete each of the loopback tests, such as electrical loopback testing, optical loopback testing, and link traffic testing, is about 900 seconds. Other embodiments could transmit advertisement frames at other predetermined time intervals and/or at the LLDP TxInterval. The LLDP TxInterval could range from about 4-180 seconds. As an example, the LLDP TxInterval could have a default value of about 30 seconds. Although not shown in FIGS. 20A-20C, the negotiated advertisement time intervals can vary for one or more of the loopback tests while in other embodiments or be the same for one or more of the loopback tests.

The ladder diagram of FIG. 20A starts at the D0 state by performing a physical link up operation between a peer port 2002 of a first peer device 2006 and a peer port 2004 of a second peer device 2008. Afterwards, the peer port 2002 and peer port 2004 transition to a D1 state to perform LLDP initialization. At the D2 state, the peer ports 2002 and 2004 exchanges capabilities relating to a local electrical loopback test and perform negotiation operations, such as negotiating advertisement time intervals and which peer device acts as the test initiator and the test responder. FIG. 20A illustrates that initially the first peer device 2006 is set to be the test initiator and the second peer device 2008 is set to be the test responder. Also at the D2 state, the first peer device 2006 triggers a timer that tracks when the advertisement time interval ends. Afterwards, the peer port 2002 transitions to the D2_I state and the peer port 2004 transitions to a D2_T state.

The first peer device 2006 performs local electrical loopback testing at the peer port 2002 after transitioning into the D2_I state. Once the timer triggered in the D2 state reaches the halfway point of the advertisement time interval, the first peer device clears the local electrical loopback and sends a notification to the second peer device that the peer port 2002 is no longer in loopback mode. Although FIG. 20A illustrates that clearing of the local electrical loopback occurs at the halfway point of the advertisement time interval, other embodiments could clear the local electrical loopback at different predetermined time intervals. After the entire advertisement time interval lapses, both peer ports 2002 and 2004 return to the D2 state to relearn peer capabilities. In this instance, both peer ports 2002 and 2004 return to the D2 since a local electrical loopback test has not been performed at peer port 2004.

When returning to the D2 state, the first peer device 2006 is set as the test responder and the second peer device 2008 is set as the test initiator. The second peer device 2008 starts a timer to monitor the advertisement time interval once it receives the advertisement frame to relearn peer capabilities from peer port 2002. From the D2 state, peer port 2002 transitions to a peer port D2_T state and peer port 2004 transitions to a D2_I state. At this point, the second peer device 2008 performs local electrical loopback testing at peer port 2004. As shown in FIG. 20A, peer port 2004 may then send a notification to peer port 2002 to indicate that the local electrical loopback has been cleared after the advertisement time interval reaches the halfway point. Once the entire advertisement time interval expires, because both peer devices 2006 and 2008 have performed local electrical loopback testing, the peer devices 2006 and 2008 exchange results and moves to the next loopback test. FIG. 20A illustrates that the peer ports 2002 and 2004 transition to the D3 state after an advertisement time interval elapses from when the peer devices 2006 and 2008 exchange results.

The next loopback test the D_Port diagnostics perform is optical loopback testing at the peer port 2002 and peer port 2004. In FIG. 20A, after an advertisement time interval elapses from the time that the peer devices 2006 and 2008 exchange results, peer ports 2002 and 2004 transition to a D3 state to exchange peer capabilities and perform negotiation operations for optical loopback testing. At the D3 state, the first peer device 2006 is set as the test initiator and the second peer device 2008 is set as the test responder. The second peer device 2008 starts a timer to monitor the advertisement time interval. Subsequently, in FIG. 20B, peer port 2002 transitions to a D3_I state and peer port 2008 transitions to a D3_T state to perform optical loopback at peer port 2004. As the negotiated advertisement time interval reaches the halfway point, the peer port 2004 sends a notification to the peer port 2002 indicating the second peer device 2008 has cleared the optical loopback.

Once the second half of the advertisement time interval expires, peer ports 2002 and 2004 transition back to the D3 state to continue optical loopback testing. At the D3 state, the peer devices 2006 and 2008 exchange advertisement frames to relearn capabilities, perform negotiation operations. FIG. 20B illustrates that during this negotiation operation, the first peer device 2006 is set as the test responder and the second peer device 2008 is set as the test initiator. The first peer device 2006 starts a time to monitor the advertisement time interval. Peer port 2002 then transitions to D3_T, and peer port 2004 transitions to D3_I to perform optical loopback at peer port 2002. Once the negotiated advertisement time interval reaches the halfway point, peer port 2002 sends notification to the peer port 2004 that the first peer device 2006 has cleared the optical loopback. After the second half of the advertisement time interval elapses, the first peer device 2006 and second peer device 2008 exchange results. Peer ports 2002 and 2004 transition to the D4 state after an advertisement time interval lapses after exchanging results.

Peer ports 2002 and 2004 transition to the D4, D4_I, and D4_T states to perform remote electrical loopback testing and D5, D5_I, and D5_T to perform link traffic testing. FIGS. 20B and 20C illustrates that peer ports 2002 and 2004 transition to the D4, D4_I, and D4_T states in a similar process (e.g., exchange peer capability, negotiation operations, and transmission of advertisement frames) as to how the peer ports 2002 and 2004 transitioned between the D3, D3_I, and D3_T. For instance, peer port 2002 transitions from a D4 state to a D4_I state, a D4 state, and then back to a D4_T state when performing remote electrical loopback state. FIGS. 20B and 20C illustrates that peer ports 2002 and 2004 transition back to the D5, D5_I, and D5_T states using similar timing and exchange of advertisement frames as described for the D3, D3_I, and D3_T states.

FIG. 20C illustrates that once all loopback testing is completed, the peer ports 2002 and 2004 transition to the D6 state. Recall that the D6 state can be indicative that all loopback tests completed successfully. Peer devices 2006 and 2008 transition to the D6 state after an advertisement time interval elapses after exchanging results of the link traffic testing. Although FIGS. 20A-20C illustrate the utilization of advertisement frames and advertisement time intervals to start and stop loopback testing and transitioning to different states, other embodiments could utilize toggling to implement D_port diagnostic testing with LLDP.

As discussed above, to implement diagnostic testing using D_Ports within an Ethernet based network, peer devices, such peer devices 2006 and 20008 shown in FIGS. 20A-20C, may utilize LLDP. Implementing D_Port diagnostic testing with LLDP provides for greater flexibility and compatibility with a variety of Ethernet based networks. Utilizing LLDP also allows configuring the peer ports as D_Ports in a similar process as shown in FIGS. 8, 10, and 12 except that LLDP is used in place of an FC protocol. For example, FIGS. 8, 10, and 12 illustrate configuring a port and HBA port for D_port diagnostic testing statically or dynamically. Peer ports can also be configured as D_ports statically or dynamically using LLDP. Once peer ports are configured as D_ports, peer devices to negotiate D_Port capabilities, when to start and stop loopback testing, and advertisement time intervals based on LLDP. The ports transition through a D_Port state diagram (shown in FIG. 19) to perform different loopback tests by exchanging advertisement frames according to the negotiated advertisement time intervals.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A device comprising:
   a processor;
   a network frame handling element coupled to the processor and including a capability to loop back received frames, wherein the network frame handling element is configured to couple to a media interface that includes a capability to loopback incoming optical signals, wherein the media interface and the network frame handling element cooperate to provide the hardware portion of a network port; and
   a memory readable by the processor and comprising instructions stored thereon to cause the processor to perform program-based portions of the network port including to:
      configure the network port to enter a diagnostic mode that performs one or more loopback tests;
      determine an advertisement time interval to transition the network port to different loopback test states when the network port is operating in the diagnostic mode;

receive a first advertisement frame through the network port from a remote port of a remote device that triggers a start of the advertisement time interval;

perform a loopback test with the network port after the start of the advertisement time interval;

clear the loopback test for the network port at a predetermined time interval from the start of the advertisement time interval, wherein a duration of the predetermined time interval is at least a halfway point before expiry of the advertisement time interval;

send a notification to the remote device that the network port is not in any of the loopback test states at the predetermined time interval; and transition the network port to a next loopback test state after the advertisement time interval ends.

2. The device of claim 1, wherein the instructions further cause the processor to perform program-based portions of the network port including to transmit a notification indicating the device has cleared the loopback test at the network port.

3. The device of claim 1, wherein the instructions further cause the processor to perform program-based portions of the network port including to transmit a third advertisement frame in response to the advertisement time interval ending, wherein the third advertisement frame is indicative of the device's capability to perform a second loopback test.

4. The device of claim 1, wherein the first advertisement frame is based on a Link Level Discovery Protocol.

5. The device of claim 1, wherein the instructions further cause the processor to perform program-based portions of the network port including to:

determine a second advertisement time interval to transition the network port to different loopback test states for a second loopback test when the network port is operating in diagnostic mode;

receive a second advertisement frame from the remote port that triggers a start of the second advertisement time interval;

transmit one or more test frames to the remote port;

receive looped back test frames from the remote port;

receive a notification indicating the remote device has cleared the second loopback test at a second predetermined time interval determined from the start of the second advertisement time interval, wherein a second duration of the second predetermined time interval is at least a portion of the second advertisement time interval; and transition to a subsequent loopback test state after the second advertisement time interval ends.

6. The device of claim 5, wherein the instructions further cause the processor to perform program-based portions of the network port including to:

determine a third advertisement time interval to transition the network port to different loopback test states for a third loopback test and a fourth advertisement time interval to transition the network port to different loopback test states for a fourth loopback test;

perform a third loopback test in response to receiving a third advertisement frame after the second advertisement time interval ends and the second loopback test is complete; and perform a fourth loopback test in response to receiving a fourth advertisement frame after the third advertisement interval ends and the third loopback test is complete.

7. The device of claim 6, wherein the first loopback test is a local electrical loopback test, wherein the second loopback test is an optical loopback test, wherein the third loopback test is a remote electrical loopback test, and wherein the fourth loopback test is a link traffic test.

8. The device of claim 5, wherein the first loopback test is one of a local electrical loopback test, an optical loopback test, remote electrical loopback test, or a link traffic test, and wherein the second loopback test is one of a local electrical loopback test, an optical loopback test, remote electrical loopback test, or a link traffic test and differs from the first loopback test.

9. The device of claim 1, wherein the first advertisement frame is part of a negotiation operation between the device and the remote device to set the advertisement timing interval.

10. A network comprising:

a first device including a first processor and a first network frame handling element coupled to the first processor, wherein the first network frame handling element is configured to couple to a first media interface that includes a capability to loopback incoming optical signals, wherein the first media interface and the first network frame handling element cooperate to provide the hardware portion of a first network port;

a second device including a second processor and a second network frame handling element coupled to the second processor, wherein the second network frame handling element is configured to couple to a second media interface that includes a capability to loopback incoming optical signals, wherein the second media interface and the second network frame handling element cooperate to provide the hardware portion of a second network port; and a link connected to the first media interface and to the second media interface; wherein the first processor is adapted to:

configure the first network port to enter a diagnostic mode that performs one or more loopback tests;

determine an advertisement time interval to transition the first and the second network ports to different loopback test states when the first and the second network ports are operating in diagnostic mode, and receive a first advertisement frame through the first network port from the second network port that triggers a start of the advertisement time interval;

perform a loopback test with the first network port after the start of the advertisement time interval;

clear the loopback test for the first network port at a predetermined time interval from the start of the advertisement time interval, wherein a duration of the predetermined time interval is at least a halfway point before expiry of the advertisement time interval;

send a notification to the second network port that the first network port has cleared the loopback test at the predetermined time interval; and transition the first network port to a next loopback test state after the advertisement time interval ends.

11. The network of claim 10, wherein the first network port is adapted to transmit a third advertisement frame in response to the advertisement time interval ending, wherein the third advertisement frame is indicative of the first device's capability to perform a second loopback test.

12. The network of claim 10, wherein the first advertisement frame is part of a negotiation operation between the device and the second device to set the advertisement timing interval.

13. A method comprising:
configuring a first network port in a first device to enter a diagnostic mode that performs one or more loopback tests, wherein the first network port includes a first media interface with capabilities to loop back incoming optical signals received from a second network port;
configuring the second network port in a second device to enter the diagnostic mode that performs the one or more loopback tests, wherein the second network port includes a second media interface with capabilities to loop back incoming optical signals received from the first network port;
determining an advertisement time interval to transition the first and the second network ports to different loopback test states when the first and the second network ports are operating in diagnostic mode;
receiving, at the first network port, a first advertisement frame from the second network port that triggers a start of the advertisement time interval; and
performing, at the first network port, a loopback test after the start of the advertisement time interval;
clearing, at the first network port, the loopback test at a predetermined time interval from the start of the advertisement time interval, wherein a duration of the predetermined time interval is at least a halfway point before expiry of the advertisement time interval;
sending a notification from the first network port to the second network port that the first network port is not in any of the loopback test states at the predetermined time interval; and
transitioning the first network port to a next loopback test state after the advertisement time interval ends.

14. The method of claim 13, further comprising transmitting, at the first network port, a notification indicating the first device has cleared the loopback test at the first network port.

15. The method of claim 14, further comprising transmitting, at the first network port, a third advertisement frame in response to the advertisement time interval ending, wherein the third advertisement frame is indicative of the first device's capability to perform a second loopback test.

16. The method of claim 13, wherein the first advertisement frame is part of a negotiation operation between the device and the second device to set the advertisement timing interval.

17. A method comprising:
configuring a first network port in a first device to enter a diagnostic mode that performs one or more loopback tests, wherein the first network port includes a first media interface with capabilities to loop back incoming optical signals received from a remote network port of a remote device;
determining an advertisement time interval to transition a first network port to different loopback test states when the first network port is operating in diagnostic mode;
receiving, at the first network port, a first advertisement frame from the remote network port that triggers a start of the advertisement time interval;
performing, at the first network port, a loopback test after the start of the advertisement time interval;
clearing, at the first network port, the loopback test at a predetermined time interval from the start of the advertisement time interval, wherein a duration of the predetermined time interval is at least at a halfway point before expiry of the advertisement time interval;
sending a notification from the first network port to the remote network port that the first network port has cleared the loopback test at the predetermined time interval; and
transitioning the first network port to a next loopback test state after the advertisement time interval ends.

18. The method of claim 17, further comprising transmitting a third advertisement frame in response to the advertisement time interval ending, wherein the third advertisement frame is indicative of the device's capability to perform a second loopback test.

19. The method of claim 17, wherein the first advertisement frame is part of a negotiation operation between the device and the remote device to set the advertisement timing interval.

20. The device of claim 4, wherein the Link Level Discovery Protocol comprises a type-length-value designated for exchanging information to perform port diagnostics.

* * * * *